US009590429B2

(12) United States Patent
Kishimoto et al.

(10) Patent No.: US 9,590,429 B2
(45) Date of Patent: Mar. 7, 2017

(54) BATTERY UNIT, ELECTRIC VEHICLE, MOVABLE STRUCTURE, POWER SUPPLY DEVICE, AND BATTERY CONTROL DEVICE

(71) Applicant: Sanyo Electric CO., LTD., Moriguichi, Osaka (JP)

(72) Inventors: Keiji Kishimoto, Hyogo (JP); Hiroya Murao, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 411 days.

(21) Appl. No.: 14/192,210

(22) Filed: Feb. 27, 2014

(65) Prior Publication Data

US 2014/0175873 A1 Jun. 26, 2014

Related U.S. Application Data

(63) Continuation of application No. PCT/JP2012/076067, filed on Oct. 9, 2012.

(30) Foreign Application Priority Data

Oct. 27, 2011 (JP) .................................. 2011-235648

(51) Int. Cl.
*B60L 1/00* (2006.01)
*B60L 3/00* (2006.01)
(Continued)

(52) U.S. Cl.
CPC ............. *H02J 7/00* (2013.01); *B60L 11/1816* (2013.01); *B60L 11/1861* (2013.01);
(Continued)

(58) Field of Classification Search
CPC .......... H02J 7/00; H02J 7/0014; H02J 7/0018; B60L 11/1866
(Continued)

(56) References Cited

U.S. PATENT DOCUMENTS

2004/0164706 A1* 8/2004 Osborne ............... H02J 7/0018
320/116
2012/0313562 A1 12/2012 Murao et al.

FOREIGN PATENT DOCUMENTS

JP H 03-173323 A 7/1991
JP 2006-042555 A 2/2006
(Continued)

OTHER PUBLICATIONS

Office Action mailed May 20, 2016 in corresponding CN Application 201280040834.4, with partial English translation thereof (13 pages total).

*Primary Examiner* — Carlos Amaya
(74) *Attorney, Agent, or Firm* — Muncy, Geissler, Olds & Lowe, P.C.

(57) ABSTRACT

A battery system is provided with a plurality of battery units each including a battery module consisting of a plurality of battery cells, a unit control unit, and a connector, and controls the overall operation of the respective battery units in a main control unit. To the plurality of connectors of the battery units, an external unit can be selectively connected so that voltage adjustment for inhibiting voltage variations among the plurality of battery cells or the plurality of battery modules can be realized by using the external unit. The external unit is connected to the battery unit for which voltage adjustment is necessary on the basis of a voltage adjustment necessity determination.

9 Claims, 13 Drawing Sheets

(51) Int. Cl.
  *H02G 3/00* (2006.01)
  *H02J 7/00* (2006.01)
  *H01M 10/44* (2006.01)
  *H01M 10/48* (2006.01)
  *B60L 11/18* (2006.01)

(52) U.S. Cl.
  CPC ....... *B60L 11/1866* (2013.01); *H01M 10/441* (2013.01); *H01M 10/482* (2013.01); *H02J 7/0014* (2013.01); *H02J 7/0021* (2013.01); *H01M 2220/20* (2013.01); *Y02T 10/7005* (2013.01); *Y02T 10/7044* (2013.01); *Y02T 10/7055* (2013.01); *Y02T 10/7061* (2013.01)

(58) Field of Classification Search
  USPC ...................................................... 307/10.1
  See application file for complete search history.

(56) References Cited

FOREIGN PATENT DOCUMENTS

| | | |
|---|---|---|
| JP | 2008-125927 A | 5/2008 |
| JP | 2009-254208 A | 10/2009 |
| WO | WO 2008/114734 A1 | 9/2008 |
| WO | WO-2011/105083 A1 | 9/2011 |

\* cited by examiner

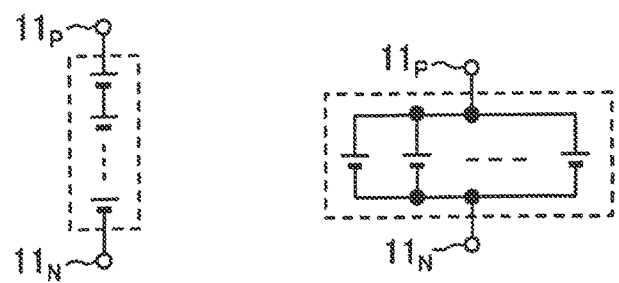
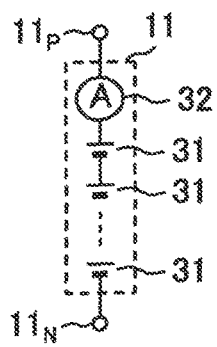
FIG. 2
FIG. 3
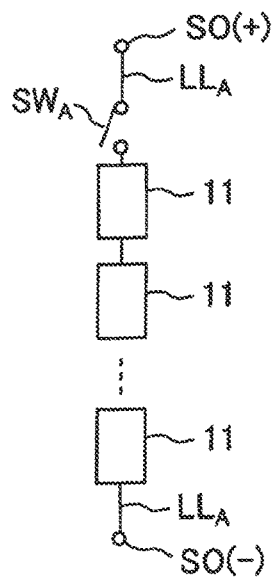
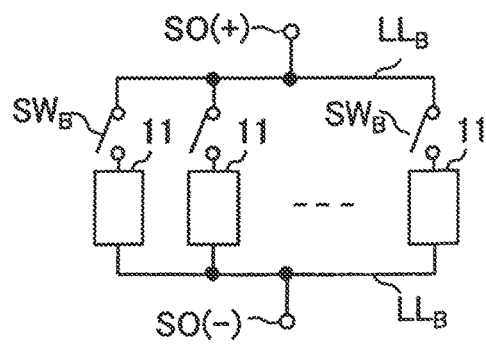
FIG. 4

BATTERY UNIT, ELECTRIC VEHICLE, MOVABLE STRUCTURE, POWER SUPPLY DEVICE, AND BATTERY CONTROL DEVICE

CROSS-REFERENCE TO RELATED APPLICATIONS

The present application is a continuation under 35 U.S.C. §120 of PCT/JP2012/076067, filed Oct. 9, 2012, which is incorporated herein by reference and which claimed priority to Japanese Patent Application No. 2011-235648 filed on Oct. 27, 2011. The present application likewise claims priority under 35 U.S.C. §119 to Japanese Patent Application No. 2011-235648 filed on Oct. 27, 2011, the entire content of which is also incorporated herein by reference.

BACKGROUND

Technical Field

The present invention relates to a battery unit, an electric vehicle, a movable structure, a power supply device, and a battery control device.

Related Art

In a battery module including a plurality of battery cells, cell voltages may vary. Such a variation is not desirable. In consideration of this point, a voltage adjustment technique which inhibits variation of cell voltages by an equalization process of the cell voltages is proposed (for example, refer to JP 2008-125297 A). In JP 2008-125297 A, a voltage adjustment function is provided on the side of a charger of a battery pack system having a battery pack, and the voltage adjustment is realized when the charger is connected to the battery pack system. In addition, in order to obtain a large output, a battery system in which a plurality of battery modules are incorporated may be formed. In a battery system having a plurality of battery modules, voltage variation may be caused among the plurality of battery modules.

It would be advantageous if the above-described voltage variation can be inhibited while avoiding an increase in the size of the battery system and an increase in the cost of the battery system.

In consideration of the above, an advantage of the present invention lies in the provision of a battery system and a battery control device that contribute to realization of both necessary voltage adjustment and size reduction of the system.

SUMMARY

According to one aspect of the present invention, there is provided a battery system comprising: a plurality of battery units each having a battery module consisting of a plurality of battery cells and a connector that is connected to the battery module and which can be connected to an external unit having a function to execute a voltage adjustment; and a voltage adjustment necessity determination unit that determines, for each battery unit, whether or not the voltage adjustment for inhibiting a voltage variation among the battery modules or the battery cells is necessary, wherein, based on a result of determination of the voltage adjustment necessity determination unit, connection of the external unit to a battery unit for which the voltage adjustment is necessary is permitted or the external unit is connected to the battery unit for which the voltage adjustment is necessary, and, in each battery unit, the voltage adjustment is enabled when the external unit is connected to the connector.

Advantageous Effects

According to various aspects of the present invention, a battery system and a battery control device that contribute to realization of both necessary voltage adjustment and size reduction of the system can be provided.

BRIEF DESCRIPTION OF THE DRAWINGS

FIGS. 2(a) and 2(b) are diagrams showing example connection methods of a plurality of secondary batteries in a battery module.

FIG. 3 is a diagram showing an example structure of a battery module.

FIGS. 4(a) and 4(b) are diagrams showing example connection methods of a plurality of battery modules.

DETAILED DESCRIPTION

Figure 1:
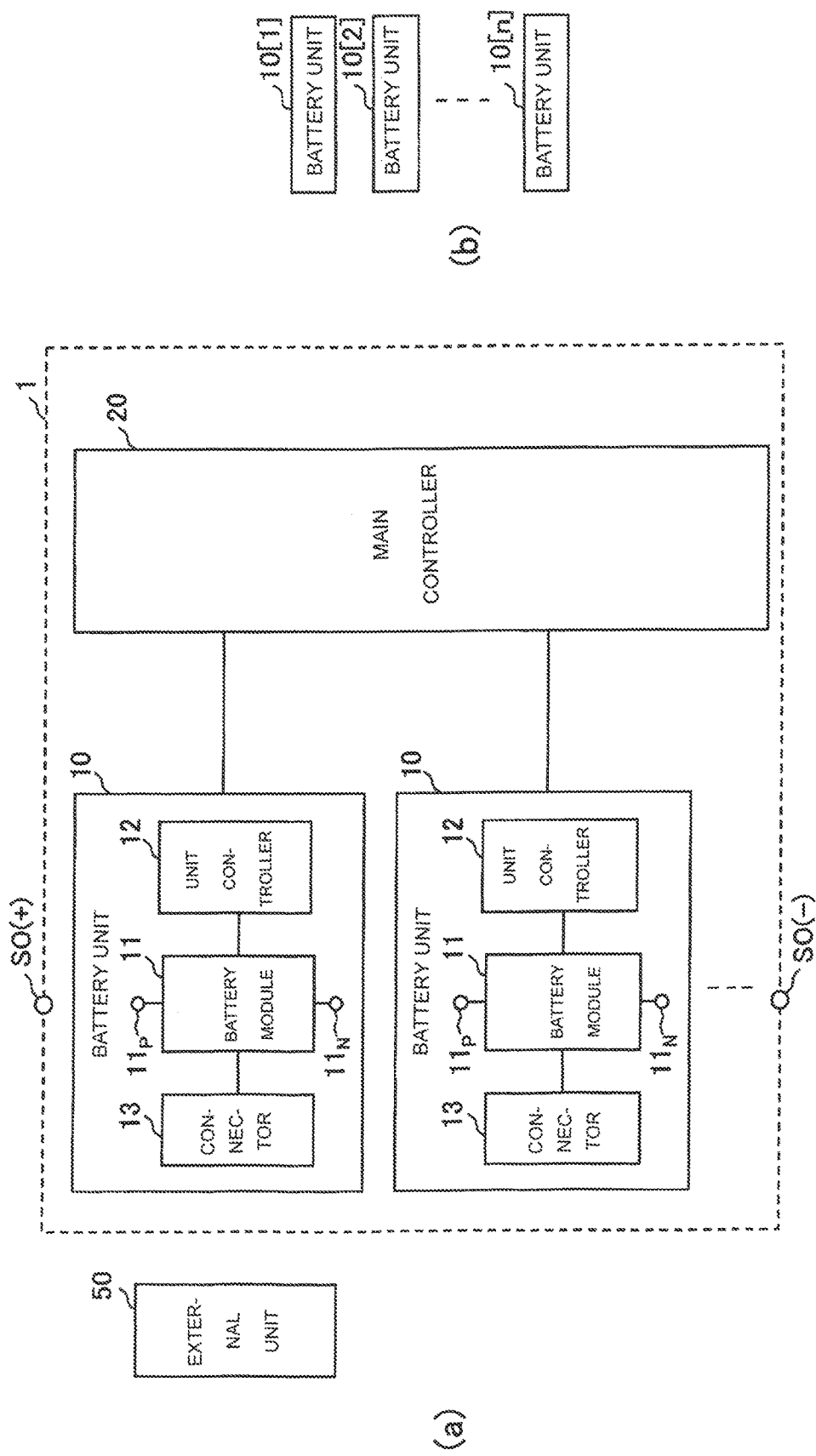
FIG. 1(a) is an overall block diagram showing a schematic structure of a battery system according to a preferred embodiment of the present invention.
FIG. 1(b) is a diagram showing a plurality of battery units.

A preferred embodiment of the present invention will now be described in detail with reference to the drawings. In the referred diagrams, identical elements are assigned the same reference numerals, and their descriptions will not be repeated. In the present specification, in order to simplify description, signs or reference signs which refer to information, signal, physical quantity, state quantity, member, etc., may be assigned, and the actual names for information, signal, physical quantity, state quantity, member, etc., corresponding to the signs or reference signs may be omitted or abbreviated.

FIG. 1(a) is an overall block diagram schematically showing a structure of a battery system 1 according to a preferred embodiment of the present invention. The battery system 1 comprises a plurality of battery units 10, a main controller 20, and a pair of system output terminals SO(+) and SO(−). A number of the battery units 10 in the battery system 1 is n (where n is an integer greater than or equal to 2). In the following description, the first—nth battery units 10 in the battery system 1 may be called battery units 10[1]~10[n], respectively (refer to FIG. 1(b)).

Each battery unit 10 comprises a battery module 11, a unit controller 12, and a connector 13. Electric power based on an output voltage of the battery module 11 of the battery unit 10 can be supplied to a load (which may include an electric power converter such as a DC-to-DC converter) (not shown) through the system output terminals SO(+) and SO(−). The battery module 11 is connected to the unit controller 12 and the connector 13. An external unit 50 can be connected to the connector 13. The respective battery units 10 and the main controller 20 are connected to each other via a communication line or the like, so that arbitrary information and signals can be communicated between the respective battery units 10 and the main controller 20.

The battery module 11 can be constructed with a plurality of secondary batteries (for example, a lithium ion secondary battery, or a nickel metal hydrate secondary battery). Of the plurality of secondary batteries of the battery module 11, a positive electrode terminal of the secondary battery on which the highest potential is applied is connected to a positive output terminal $11_P$, and a negative electrode terminal of the secondary battery on which the lowest potential is applied is connected to a negative output terminal $11_N$. The type of the secondary battery forming the battery module 11 may be arbitrary. The plurality of secondary batteries in the battery module 11 may be connected in series as shown in FIG. 2(a) or connected in parallel to each other as shown in FIG. 2(b). In addition, in the battery module 11, a series connection circuit of the secondary batteries and a parallel connection circuit of the secondary batteries may exist in a mixed manner, or a plurality of parallel connection circuits of the secondary batteries may be connected in series.

In the following, in order to provide more concrete description, the battery module 11 is considered to have the structure as shown in FIG. 3, unless otherwise specified. That is, the battery module 11 is considered to be made of a series connection circuit of a plurality of battery cells 31 which are a plurality of secondary batteries. In addition, a current sensor 32 for detecting a value of a current flowing in the plurality of battery cells 31 is provided in the battery module 11. The current sensor 32 may alternatively be provided outside of the battery module 11. Alternatively, a parallel connection of a plurality of battery cells may constitute one battery cell 31.

In the battery system 1, the plurality of battery modules 11 in the plurality of battery units 10 may be connected in series with each other as shown in FIG. 4(a). For the purpose of description, a structure in which the plurality of battery modules 11 are connected in series will be referred to as a "series connection structure." In the series connection structure, the series connection circuit of the plurality of battery modules 11 is connected to the system output terminals SO(+) and SO(−) via a primary power line $LL_A$. Of the terminals SO(+) and SO(−), a higher potential is applied to the terminal SO(+). In the series connection structure, a switch $SW_A$ may be provided between the primary power line $LL_A$ connected to the system output terminal SO(+) and the positive output terminal $11p$ of the battery module 11 at the highest potential side. In place of or in addition to such a structure, a switch $SW_A$ may be provided between the primary power line $LL_A$ connected to the system output terminal SO(−) and the negative output terminal $11_N$ of the battery module 11 at the lowest potential side, or a switch $SW_A$ may be provided between adjacent battery modules 11. When the switch $SW_A$ is in the ON state, the series connection circuit of the battery modules 11 and the system output terminals SO(+) and SO(−) are electrically connected to each other, and, when the switch $SW_A$ is in the OFF state, the series connection circuit of the battery modules 11 and the system output terminals SO(+) and SO(−) are electrically disconnected from each other.

In the battery system 1, the plurality of battery modules 11 in the plurality of battery units 10 may be connected in parallel to each other as shown in FIG. 4(b). For the purpose of description, a structure in which the plurality of battery modules 11 are connected in parallel to each other will be referred to as a "parallel connection structure." In the parallel connection structure, the parallel connection circuit of the plurality of battery modules 11 is connected to the system output terminals SO(+) and SO(−) via a primary power line $LL_B$. When the parallel connection structure is employed, in the battery system 1, a switch $SW_B$ is provided for each battery module 11 (in other words, for each battery unit 10), and each battery module 11 is connected to the primary power line $LL_B$ and the system output terminals SO(+) and SO(−) via the corresponding switch $SW_B$. In the example structure of FIG. 4(b), the switch $SW_B$ is provided between the primary power line $LL_B$ connected to the system output terminal SO(+) and the positive output terminal $11_P$ of each battery module 11. Alternatively, in place of or in addition to such a structure, a switch $SW_B$ may be provided between the primary power line $LL_B$ connected to the system output terminal SO(−) and the negative output terminal $11_N$ of each battery module 11. For a certain battery module 11, when the corresponding switch $SW_B$ is in the ON state, the battery module 11 and the system output terminals SO(+) and SO(−) are electrically connected to each other, and, when the switch $SW_B$ is in the OFF state, the battery module 11 and the system output terminals SO(+) and SO(−) are electrically disconnected from each other.

In the battery system 1, the series connection circuit of the battery modules 11 and the parallel connection circuit of the battery modules 11 may exist in a mixed manner, and a plurality of parallel connection circuits of two or more battery modules 11 may be connected in series. In addition, an arbitrary switch provided in the battery system 1 including the switch $SW_A$ and the switch $SW_B$ may be formed by an arbitrary semiconductor switching element (such as a field effect transistor), a mechanical switch, or the like.

In each battery unit 10, the unit controller 12 can detect at least one of a cell voltage which is an output voltage of each battery cell 31, a module voltage which is an output voltage of the battery module 11, a cell SOC which is an SOC (State Of Charge) of each battery cell 31, and a module SOC which is an SOC of the battery module 11. Each unit controller 12 can output to the main controller 20 at least one of cell voltage information indicating a detected value of the cell voltage of each battery cell 31, module voltage information indicating a detected value of the module voltage, cell SOC information indicating a detected value of the cell SOC, and module SOC information indicating a detected value of the module SOC (refer to FIG. 5). The main controller 20 uses the information input from each unit controller 12, to permit or prohibit charging or discharging of each battery module 11 by switching the switch $SW_A$ or $SW_B$ ON or OFF, or to determine the necessity of an in-module voltage adjustment and an inter-module voltage adjustment to be described later (details will be described later).

The cell voltage refers to a voltage between a positive electrode terminal and a negative electrode terminal of the battery cell 31, and may be an open circuit voltage of the battery cell 31. The module voltage refers to a voltage between the terminals $11_P$ and $11_N$ of the battery module 11, and may be an open circuit voltage of the battery module 11 (a total value of the open circuit voltages of the battery cells 31 in the battery module 11). The cell SOC for a certain battery cell 31 refers to a ratio of an actual remaining capacity of the battery cell 31 with respect to an accumulation capacity of the battery cell 31 when the battery cell 31 is in the fully charged state (that is, the fully charged capacity of the battery cell 31). The module SOC for a certain battery module 11 refers to a ratio of an actual remaining capacity of the battery module 11 with respect to an accumulation capacity of the battery module 11 when the battery module 11 is in the fully charged state. Therefore, the cell SOC information is one type of information pertaining to the remaining capacity of the battery cell 31 (remaining capacity information), and the module SOC information is one type of information pertaining to the remaining capacity of the battery module 11 (remaining capacity information).

Figure 5:
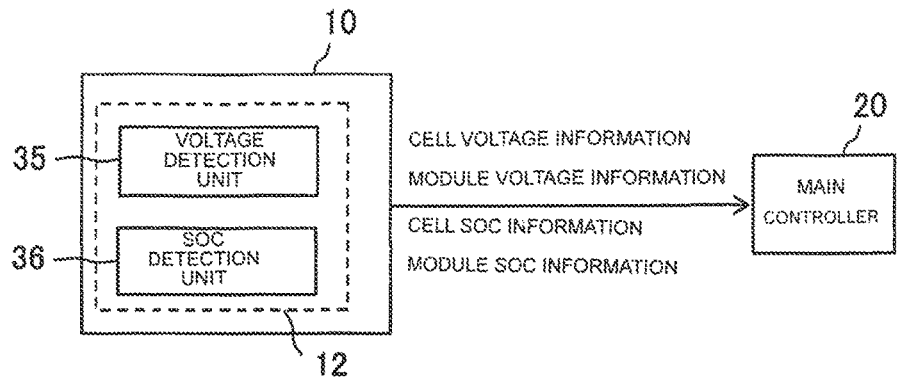
FIG. 5 is a diagram showing an example content of information transmitted from a battery unit to a main controller.

The unit controller 12 can detect the cell voltage and cell SOC for each battery cell 31 and the module voltage and module SOC, using a known arbitrary method (for example, that described in International Publication No. WO/2011/105083). For the detection, for example, a processor 210 in FIG. 1 of International Publication No. WO/2011/105083 may be used, and a voltage value updating unit 260 of the same figure may be further used. As shown in FIG. 5, in the unit controller 12, there may be provided a voltage detection unit 35 which detects the cell voltage for each battery cell 31 and the module voltage, and an SOC detection unit 36 which detects the cell SOC for each battery cell 31 and the module SOC.

The voltage detection unit 35 may be formed by a voltage sensor which directly detects the cell voltage and the module voltage, or may detect (calculate) the cell voltage and the module voltage through a calculation based on an output current value of the battery module 11 using a detection result of the current sensor 32, as described in International Publication No. WO/2011/105083.

The SOC detection unit 36 can calculate, for example, under a condition that the cell voltage or cell SOC is known at a first timing, the cell SOC at a second timing (the second timing being a timing later than the first timing) based on the fully charged capacity of the battery cell 31 and the total amount of passed current in the battery cell 31 between the first and second timings. Similarly, the SOC detection unit 36 can calculate, for example, under a condition that the module voltage or module SOC is known at the first timing, the module SOC at the second timing based on the fully charged capacity of the battery module 11 and the total amount of passed current in the battery module 11 between the first and second timings. The total amount of passed current in the battery cell 31 includes a charging current to the battery cell 31 and a discharging current from the battery cell 31, the total amount of passed current in the battery module 11 includes a charging current to the battery module 11 and a discharging current from the battery module 11, and these current values can be obtained from the current sensor 32.

In the structure of FIG. 3, even when the plurality of battery cells 31 are charged and discharged under the same conditions, a variation may be caused in the cell voltage among the plurality of battery cells 31. In a state where such a variation is caused, excessive charging or excessive discharging of a part of the battery cells 31 may be caused, or it may become necessary, in order to avoid excessive charging of a part of the battery cell 31, to stop charging of another battery cell 31 which can still be charged or, in order to avoid excessive discharging of a part of the battery cells 31, to stop discharging of another battery cell 31 which can still be discharged. In the battery system 1, as a process for inhibiting variation in cell voltages among a plurality of battery cells 31 in the battery module 11 (which can be referred to as "voltage variation of battery cells"), an in-module voltage adjustment may be employed. The voltage variation of battery cells may be, for example, a difference between a maximum value and a minimum value of the plurality of cell voltages, or may be a variance or a standard deviation of the plurality of cell voltages.

Similarly, in the series connection structure of FIG. 4(a), even when the plurality of battery modules 11 are charged and discharged under the same conditions, the module voltages may vary among the plurality of battery modules 11. In the parallel connection structure of FIG. 4(b) also, the open circuit voltages may vary among the plurality of battery modules 11. Disadvantages due to the variation of the module voltage (which may be the open circuit voltage) are similar to those for the cell voltage. In the battery system 1, as a process for inhibiting the variation of the module voltages among the plurality of battery modules 11 (which may be referred to as "voltage variation of battery modules"), an inter-module voltage adjustment may be employed. The voltage variation of the battery modules may be, for example, a difference between a maximum value and a minimum value of the plurality of module voltages, or a variance or a standard deviation of the plurality of module voltages.

In the following description, in order to simplify description, the in-module voltage adjustment and the inter-module voltage adjustment will be referred to simply as voltage adjustment. Another way to interpret this is to consider the voltage adjustment as referring to one of the in-module voltage adjustment and the inter-module voltage adjustment.

Figure 6:
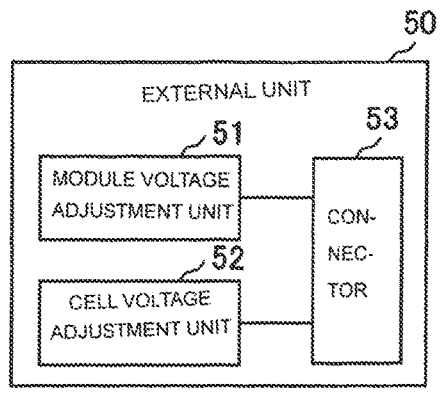
FIG. 6 is a schematic structural block diagram of an external unit according to a preferred embodiment of the present invention.

As a device for realizing the voltage adjustment, the external unit 50 of FIG. 6 may be connected to each battery unit 10. The external unit 50 comprises a module voltage adjustment unit 51, a cell voltage adjustment unit 52, and a connector 53 which can be connected to the connector 13 of each battery unit 10. Alternatively, one of the adjustment units 51 and 52 may be omitted from the external unit 50.

The connection between the connector 53 of the external unit 50 and the connector 13 of a battery unit 10[$i$] which is an arbitrary battery unit 10 may hereinafter be referred to simply as the connection between the external unit 50 and the battery unit 10[$i$] (where i is an integer). When the external unit 50 and the battery unit 10[$i$] are connected, arbitrary information and signals can be communicated between the external unit 50 and the battery unit 10[$i$], and the voltage adjustment for the battery unit 10[$i$] can be realized. The connection between the external unit 50 and the battery unit 10[$i$] may be achieved by a manual operation by a user or an administrator (including so-called "service personnel") of the battery system 1, or may be achieved by the control of the main controller 20 without such a manual operation. When the connection between the unit 50 and the battery unit 10[$i$] is to be achieved by the manual operation, the battery system 1 can send to the user or the like of the battery system 1 a notification for prompting connection of the external unit 50 to the battery unit 10[$i$] for which the voltage adjustment is necessary (a determination result notification in a second structure to be described later is an example of the notification). When the external unit 50 and the battery unit 10[$i$] are to be connected not through the manual operation, the battery system 1 may execute the operation to connect the external unit 50 to the battery unit 10[$i$] for which the voltage adjustment is required, through a drive mechanism or the like (an example realization of this will be described later in a seventh structure). The battery system 1 can determine whether or not the voltage adjustment is necessary by use of a voltage adjustment necessity determination unit 21 (refer to FIG. 7) to be described later, and can execute the above-described notification and connection operations based on a result of the determination.

For the realization of the adjustment units 51 and 52, a certain circuit size and cost would be required, and thus, provision of the adjustment units 51 and 52 in each battery unit 10 would increase the size and cost of each battery unit 10 and the battery system 1. In addition, voltage adjustment for inhibiting the voltage variation is not frequently required. In consideration of this, as described above, a structure may be employed in which the adjustment units 51 and 52 are provided in the external unit 50, and the external unit 50 is connected to any of the battery unit 10 when necessary. With such a configuration, it is possible to realize the structure of the battery system 1 with a small size and low cost while securely enabling realization of the necessary voltage adjustment.

Alternatively, the number of external units 50 applied to the battery system 1 may be two or more. When a plurality of external units 50 are to be used, a plurality of external units 50 may be simultaneously connected to a plurality of battery units 10 for which the voltage adjustment is required. In the following description, however, a configuration is primarily considered in which only one external unit 50 is used.

In the following, a more detailed example structure, alternative configuration, or applied configuration of the battery system 1 having the basic structure as described above will be described in a plurality of structures. So long as there is no contradiction, items described in two or more structures may be combined.

<<First Structure>>

Figure 7:
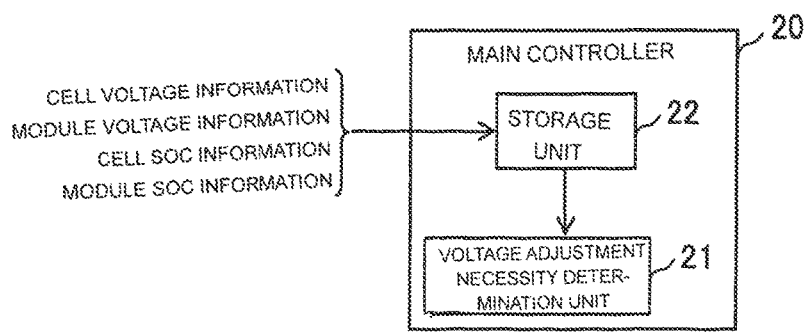
FIG. 7 is a block diagram of a part having a function of necessity determination of a voltage adjustment according to a first structure of the present invention.

A first structure will now be described. In the first structure, the necessity determination method of voltage adjustment will be described. As shown in FIG. 7, the voltage adjustment necessity determination unit 21 and a storage unit 22 may be provided in the main controller 20. Alternatively, the voltage adjustment necessity determination unit 21 may be formed by the main controller 20 and each unit controller 12. The storage unit 22 stores the cell voltage information, module voltage information, cell SOC information, and module SOC information which are sent from each unit controller 12. The determination unit 21 refers to the stored content of the storage unit 22, and can use at least one of the cell voltage information, module voltage information, cell SOC information, and module SOC information, to determine the necessity of voltage adjustment for each battery unit 10 (that is, for each battery module 11). With the use of these types of information, the necessity of the voltage adjustment can be accurately determined.

—Necessity Determination of Inter-Module Voltage Adjustment—

The determination unit 21 can determine the necessity of the inter-module voltage adjustment based on the module voltages Vmod[1] ~Vmod[n] of the battery modules 11 indicated by the module voltage information. The module voltages Vmod[1]~Vmod[n] are the module voltages of the battery units 10[1]~10[$n$], respectively, and are preferably open circuit voltages of the battery modules 11 of the battery units 10[1]~10[$n$] (however, in the series connection structure, the module voltage may not be the open circuit voltage). In a state where the switch $SW_A$ or $SW_B$ is switched OFF, each module voltage is detected, so that each unit controller 12 can know the open circuit voltage of each battery module 11. A configuration may be employed in which each unit controller 12 estimates the open circuit voltage of each battery module 11 based on each module SOC (in this case, the switching OFF of the switch $SW_A$ or $SW_B$ for the detection of the open circuit voltage is not necessary).

Alternatively, the determination unit 21 can determine the necessity of the inter-module voltage adjustment based on the information SOCmod[1]~SOCmod[n] included in the module SOC information. The SOCmod[1]~SOCmod[n] are the module SOCs of the battery modules 11 of the battery units 10[1]~10[$n$], respectively.

The determination unit 21 can determine the necessity of the inter-module voltage adjustment based on a variation of determination physical quantity Pmod[1]~Pmod[n], using the Vmod[1]~Vmod[n] or SOCmod[1]~SOCmod[n] as the determination physical quantity Pmod[1]~Pmod[n].

More specifically, for example, the determination unit 21 calculates an average value $Pmod_{AvE}$ of the determination physical quantities Pmod[1]~Pmod[n], and determines whether or not an inequality "|Pmod[i]−$Pmod_{AvE}$|≥$TH_2$" is satisfied ($TH_2$>0). Then, for example, when the inequality "|Pmod[i]−$Pmod_{AvE}$|≥$TH_1$" is satisfied, the determination unit 21 may determine that the inter-module voltage adjustment is necessary for the battery unit $10[i]$, and in other cases, the determination unit 21 may determine that the inter-module voltage adjustment is not necessary for the battery unit $10[i]$. The determination unit 21 can make such a determination for each battery unit 10.

Alternatively, for example, the determination unit 21 may determine a maximum value $\text{Pmod}_{MAX}$ and a minimum value $\text{Pmod}_{MIN}$ in the determination physical quantities $\text{Pmod}[1]$~$\text{Pmod}[n]$, and determine whether or not an inequality "$\text{Pmod}_{MAX} - \text{Pmod}_{MIN} \geq TH_2$" is satisfied ($TH_2 > 0$). Then, for example, when the inequality "$\text{Pmod}_{MAX} - \text{Pmod}_{MIN} \geq TH_2$" is satisfied, the determination unit 21 may determine that the inter-module voltage adjustment is necessary for the battery unit 10 having the maximum value $\text{Pmod}_{MAX}$ as the module voltage or the module SOC, or for the battery unit 10 having the minimum value $\text{Pmod}_{MIN}$ as the module voltage or the module SOC, and in other cases, the determination unit 21 may determine that the inter-module voltage adjustment is not necessary for the battery units 10.

Alternatively, the determination unit 21 may use both the module voltage information and the module SOC information to determine the necessity of the inter-module voltage adjustment. In the inequalities described above or to be described below, the inequality "$\geq$" (greater than or equal to) may be replaced with the inequality "$>$" (greater than). $TH_1$ and $TH_2$, and $TH_3$ and $TH_4$ to be described below are predetermined thresholds.

—Determination of Necessity of in-Module Voltage Adjustment—

Figure 8:
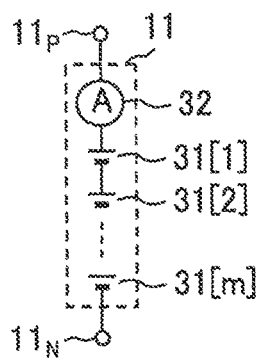
FIG. 8 is a diagram showing an example structure of a battery module.

The determination unit 21 can determine the necessity of the in-module voltage adjustment for each battery unit 10. The determination unit 21 can determine the necessity of the in-module voltage adjustment for the battery unit $10[i]$ based on the cell voltages $\text{Vcl}[1]$~$\text{Vcl}[m]$ of the battery cells 31 indicated by the cell voltage information of the battery unit $10[i]$. Here, as shown in FIG. 8, a configuration is considered in which the battery module 11 of each battery unit 10 comprises m battery cells 31, and the m battery cells 31 are referred to as battery cells $31[1]$~$31[m]$ (where m is an integer greater than or equal to 2). The cell voltages $\text{Vcl}[1]$~$\text{Vcl}[m]$ are the cell voltages of the battery cells $31[1]$~$31[m]$, respectively, and may be open circuit voltages or not open circuit voltages of the battery cells $31[1]$~$31[m]$. Each cell voltage is detected in a state where the switch $SW_A$ or $SW_B$ is switched OFF, so that each unit controller 12 can know the open circuit voltage of each battery cell 31. Alternatively, each unit controller 12 may estimate the open circuit voltage of each battery cell 31 based on each cell SOC (in this case, the switching OFF of the switch $SW_A$ or $SW_B$ for detection of the open circuit voltage is not necessary).

Alternatively, the determination unit 21 can determine the necessity of the in-module voltage adjustment for the battery unit $10[i]$ based on the information $\text{SOCcl}[1]$~$\text{SOCcl}[m]$ included in the cell SOC information of the battery unit $10[i]$. The $\text{SOCcl}[1]$~$\text{SOCcl}[m]$ for the battery unit $10[i]$ are the cell SOCs of the battery cells $31[1]$~$31[m]$ in the battery unit $10[i]$, respectively.

The determination unit 21 can determine the necessity of the in-module voltage adjustment for the battery unit $10[i]$ based on the variation of determination physical quantities $\text{Pcl}[1]$~$\text{Pcl}[m]$ using $\text{Vcl}[1]$~$\text{Vcl}[m]$ or $\text{SOCcl}[1]$~$\text{SOCcl}[m]$ in the battery unit $10[i]$ as the determination physical quantities $\text{Pcl}[1]$~$\text{Pcl}[m]$.

More specifically, for example, the determination unit 21 calculates an average value $\text{Pcl}_{AVE}$ of the determination physical quantities $\text{Pcl}[1]$~$\text{Pcl}[m]$ in the battery unit $10[i]$, and determines whether or not an inequality "$|\text{Pcl}[j] - \text{Pcl}_{AVE}| \geq TH_3$" is satisfied ($TH_3 > 0$; j is an integer). Then, for example, for an arbitrary integer j which is greater than or equal to 1 and less than or equal to m, when the inequality "$|\text{Pcl}[j] - \text{Pcl}_{AVE}| \geq TH_3$" is satisfied, the determination unit 21 determines that the in-module voltage adjustment is necessary for the battery unit $10[i]$, and, in other cases, the determination unit 21 determines that the in-module voltage adjustment is not necessary for the battery unit $10[i]$. The determination unit 21 can make such a determination for each battery unit 10.

Alternatively, for example, the determination unit 21 calculates a maximum value $\text{Pcl}_{MAX}$ and a minimum value $\text{Pcl}_{MIN}$ of determination physical quantities $\text{Pcl}[1]$~$\text{Pcl}[m]$ in the battery unit $10[i]$, and determines whether or not an inequality "$\text{Pcl}_{MAX} - \text{Pcl}_{MIN} \geq TH_4$" is satisfied ($TH_4 > 0$). Then, for example, when the inequality "$\text{Pcl}_{MAX} - \text{Pcl}_{MIN} \geq TH_4$" is satisfied, the determination unit 21 determines that the in-module voltage adjustment is necessary for the battery unit $10[i]$, and, in other cases, the determination unit 21 determines that the in-module voltage adjustment is not necessary for the battery unit $10[i]$.

Further, for example, the determination unit 21 may calculate a variance of the determination physical quantities $\text{Pcl}[1]$~$\text{Pcl}[m]$ in the battery unit $10[i]$, determine that the in-module voltage adjustment is necessary for the battery unit $10[i]$ when the variance is greater than or equal to a predetermined value, and determine that the in-module voltage adjustment is not necessary for the battery unit $10[i]$ in other cases.

Alternatively, the determination unit 21 may determine the necessity of the in-module voltage adjustment using both the cell voltage information and the cell SOC information.

<<Second Structure>>

A second structure will now be described. A notification unit for notifying the determination result of the determination unit 21 to the user or administrator (including so-called "service personnel") may be provided in the battery system 1. This notification will hereinafter be referred to as determination result notification. The determination result notification includes an output of information that an external unit 50 may be connected to the battery unit 10 for which the determination unit 21 determines that the voltage adjustment is necessary (more specifically, information indicating that the external unit 50 may be connected in order to charge or discharge the battery cell 31 of the battery unit 10). As one form of the output, for example, the determination result notification may include a notification for prompting the user or the like of the battery system 1 to connect the external unit 50 to the battery unit 10 for which the determination unit 21 determines that the voltage adjustment is necessary (hereinafter referred to as "prompting notification"). In this case, the notification unit may be also considered as a part for executing the prompting notification based on the determination result of the determination unit 21.

Figure 9:
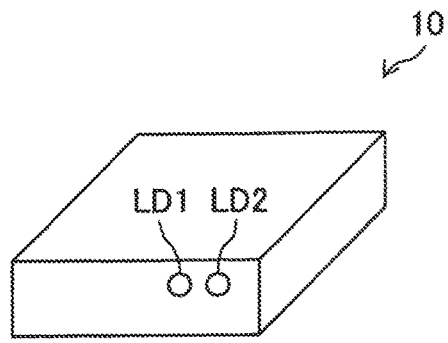
FIG. 9 is a perspective view of an outer appearance of a battery unit according to a second structure of the present invention.

For example, as shown in FIG. 9, light emitting units LD1 and LD2 comprising an LED (light Emitting Diode) or the like may be provided in each battery unit 10, to form the notification unit with the light emitting units LD1 and LD2. The unit controller 12 at each battery unit 10 can control the light emission of the light emitting units LD1 and LD2 according to the determination result of the determination unit 21. Alternatively, the light emission of the light emitting units LD1 and LD2 may be controlled directly by the main controller 20. For example, the unit controller 12 of the battery unit $10[i]$ or the main controller 20 may switch OFF the light emitting unit LD1 in normal states, and may switch ON or blink the light emitting unit LD1 when it is determined that the inter-module voltage adjustment is necessary for the battery unit 10[$i$] and the determination result is received. Similarly, for example, the unit controller 12 of the battery unit 10[$i$] or the main controller 20 may switch OFF the light emitting unit LD2 during the normal state, and may switch ON or blink the light emitting element LD2 when it is determined that the in-module voltage adjustment is necessary for the battery unit 10[$i$] and the determination result is received. Based on the light emission states of the light emitting units LD1 and LD2, the determination result notification is achieved.

Alternatively, a display device such as a liquid crystal display device may be provided in each battery unit 10 in place of the light emitting units LD1 and LD2, and the determination result notification may be realized by the display device (alternatively, the display device may be an external display device connected to the battery unit 10). Moreover, a display device such as the liquid crystal display device may be provided in the battery system 1, and the determination result notification may be realized by the display device (alternatively, the display device may be an external display device connected to the battery system 1).

The realization method of the determination result notification is not limited to those described above, and the determination result notification may be realized by an arbitrary method utilizing any of the five human senses. For example, the determination result notification may be an arbitrary visual notification using an image display or light emission as described above, or may be an arbitrary acoustic notification using sound output or buzzer or the like. The main controller 20 may transmit the determination result by the determination unit 21 to a server computer or the like present at a remote location, via the Internet or the like.

The administrator of the battery system 1 or the like can check the determination result notification by the light emission state of the light emitting units LD1 and LD2 or the like, to easily judge whether or not the voltage adjustment is required. In particular, when the connection between the external unit 50 and the battery unit 10[$i$] must be realized by a manual operation, the administrator of the battery system 1 or the like can recognize the battery unit 10 for which the voltage adjustment is required, and connect the external unit 50, based on the light emission of the light emitting units LD1 and LD2 or the like.

<<Third Structure>>

A third structure will now be described. Of the battery units 10 of the battery system 1, a battery unit for which the voltage adjustment is to be executed will be specifically called an adjustment target battery unit, and the battery module 11 in the adjustment target battery unit will be specifically called an adjustment target battery module. The battery unit 10 for which the voltage adjustment necessity determination unit 21 of FIG. 7 has determined that the inter-module voltage adjustment or in-module voltage adjustment is necessary is included in the adjustment target battery unit. Another way to consider this is that the determination unit 21 sets the adjustment target battery unit based on the necessity determination result of the voltage adjustment.

Figure 10:
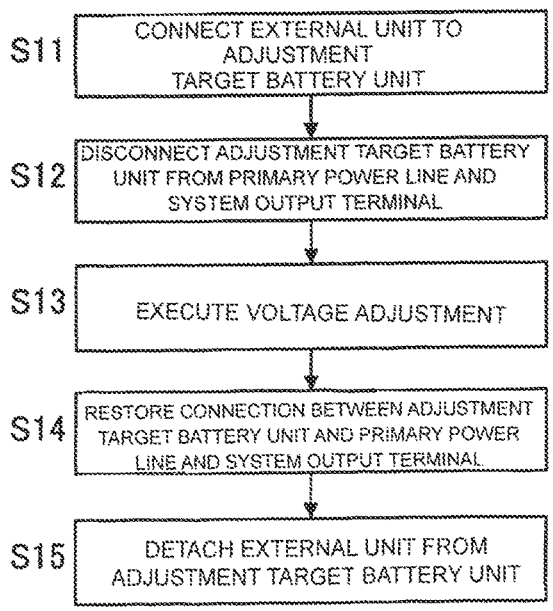
FIG. 10 is a flowchart showing a procedure of realization of the voltage adjustment according to a third structure of the present invention.

FIG. 10 is a flowchart showing a procedure to realize the voltage adjustment in the third structure. In step S11, first, the external unit 50 is connected to the adjustment target battery unit 10 through the manual operation or without the manual operation (a method without the manual operation will be described later). In the following step, S12, the unit controller 12 of the adjustment target battery unit 10 or the main controller 20 detects the connection, and disconnects the battery module 11 of the adjustment target battery unit 10 from the primary power line ($LL_A$ or $LL_B$) and the system output terminal (SO(+) and SO(−)). The disconnection corresponds to the switching OFF of the switch $SW_A$ in the series connection structure, and corresponds to switching OFF of the switch $SW_B$ between the adjustment target battery module 11 and the primary power line $LL_B$ in the parallel connection structure.

When the external unit 50 is connected to the adjustment target battery unit 10, the module voltage adjustment unit 51 and the cell voltage adjustment unit 52 of the external unit 50 are connected to the battery module 11 of the adjustment target battery unit 10 via the connector 53 and the connector 13 of the adjustment target battery unit 10. In this state, the voltage adjustment of step S13 is executed.

When it is determined that the inter-module voltage adjustment is necessary for the adjustment target battery unit 10, the inter-module voltage adjustment using the adjustment unit 51 is executed in step S13. In the inter-module voltage adjustment of step S13, the adjustment unit 51 charges or discharges the adjustment target battery module 11 so that the module voltage $Vmod_{TG}$ of the adjustment target battery module 11 coincides with an objective module voltage. Alternatively, in the inter-module voltage adjustment in step S13, the adjustment unit 51 may charge or discharge the adjustment target battery module 11 so that the $SOCmod_{TG}$ which is the module SOC of the adjustment target battery module 11 coincides with an objective module SOC. Because the adjustment of the module SOC requires a change of the module voltage, the charging or discharging targeted to coincide the $SOCmod_{TG}$ with the objective module SOC is also one type of the voltage adjustment. A charging or discharging current of the adjustment target battery module 11 flows through the external unit 50 via the connector 53. When the adjustment unit 51 charges the adjustment target battery module 11, as will be described later, an electric power source for supplying charging electric power is connected to a charging unit included in the adjustment unit 51.

For example, the voltage adjustment necessity determination unit 21 of FIG. 7 sets the objective module voltage based on the module voltages used for the determination of necessity of the inter-module voltage adjustment (for example, an average of the module voltages of the battery modules 11 other than the adjustment target battery module 11 is set as the objective module voltage), or sets the objective module SOC based on the module SOCs used for the determination of necessity of the inter-module voltage adjustment (for example, an average of the module SOCs for the battery modules 11 other than the adjustment target battery module 11 is set as the objective module SOC), and transmits the set objective module voltage or set objective module SOC to the adjustment target battery unit 10. During the execution of the inter-module voltage adjustment, the main controller 20 or the unit controller 12 of the adjustment target battery unit 10 monitors the $Vmod_{TG}$ or the $SOCmod_{TG}$ of the adjustment target battery module 11. The adjustment unit 51 stops charging or discharging of the adjustment target battery module 11 at the timing when the module voltage $Vmod_{TG}$ has reached the objective module voltage or at the timing when the $SOCmod_{TG}$ of the adjustment target battery module 11 has reached the objective module SOC, and completes the inter-module voltage adjustment.

When it is determined that the in-module voltage adjustment is necessary for the adjustment target battery unit 10, the in-module voltage adjustment using the adjustment unit 52 is executed in step S13. In the in-module voltage adjustment of step S13, the adjustment unit 52 equalizes the cell voltages of the battery cells 31 of the adjustment target battery module 11. In other words, the cell voltages of the battery cells 31 of the adjustment target battery module 11 are adjusted such that the cell voltages are equal to each other. In this process, "equal" includes a state of substantially equal, and includes a state where a difference among the plurality of cell voltages is less than or equal to a predetermined value. As a structure and a method for equalizing the cell voltages, a known structure and method (for example, those shown in International Publication No. WO/2011/105083) may be used.

Alternatively, a configuration may be employed in which, in step S13, both the inter-module voltage adjustment and the in-module voltage are executed. In addition, when only the in-module voltage adjustment is executed in step S13, it is not necessary to disconnect the battery module 11 of the adjustment target battery unit 10 from the primary power line ($LL_A$ or $LL_B$) and the system output terminal (SO(+) and SO(−)).

The completion of the voltage adjustment is recognized by or transmitted to the unit controller 12 of the adjustment target battery unit 10 and the main controller 20, and, in step S14 after the completion of the voltage adjustment, the unit controller 12 of the adjustment target battery unit 10 or the main controller 20 restores the connection between the battery module 11 of the adjustment target battery unit 10 and the primary power line ($LL_A$ or $LL_B$) and system output terminals (SO(+) and SO(−)). That is, in the series connection structure, the switch $SW_A$ is switched ON, and, in the parallel connection structure, the switch $SW_B$ between the adjustment target battery module 11 and the primary power line $LL_B$ is switched ON. Then, in step S15, the external unit 50 is disconnected from the adjustment target battery unit 10 through a manual operation or without the manual operation (the method without the manual operation will be described later). The order of execution of steps S14 and S15 may be opposite to that described above.

As described above, in the battery system 1, according to the necessity determination result of the inter-module voltage adjustment for each battery unit based on the module voltage information or the module SOC information, or based on the necessity determination result of the in-module voltage adjustment for each battery unit based on the cell voltage information or the cell SOC information, the adjustment target battery unit is set, and, for the adjustment target battery unit, a process for inhibiting variation of the module voltage among a plurality of battery modules 11 (inter-module voltage adjustment) or a process for inhibiting variation of the cell voltages among a plurality of battery cells 31 (in-module voltage adjustment) is executed. With this process, the voltage adjustment is suitably executed for the battery unit 10 for which the voltage adjustment is necessary.

During the execution of the voltage adjustment, a predetermined voltage adjustment can be realized by disconnecting the adjustment target battery unit 10 from the primary power line ($LL_A$ or $LL_B$) by switching the switch $SW_A$ or $SW_B$ OFF. In the parallel connection structure, even when the switch $SW_B$ corresponding to the adjustment target battery unit 10 is switched OFF, the supply of electric power to the load of the battery system 1 can be continued with (n−1) battery units 10.

<<Fourth Structure>>

A fourth structure will now be described. The battery module 11 is degraded with repetition of charging and discharging. A battery module 11 having a degree of degradation of a certain degree or greater should be replaced with a new battery module 11. Alternatively, for example, a battery module 11 or a battery unit 10 having some failure should be replaced with a new battery module 11 or a new battery unit 10. The replacement may be done targeting the battery module 11 or targeting the overall battery unit 10 including the battery module 11. Any of the battery modules 11 or any of the battery unit 10 may be set as the replacement target by the main controller 20 using a known degradation determination method or a known failure determination method. Here, it is considered that one of the battery units 10 is set as the replacement target.

The battery system 1 (for example, the main controller 20) preferably notifies the existence of the replacement target and the replacement target battery unit 10 to the user or the administrator (including so-called "service personnel") of the battery system 1 by an image display, a sound output, or the like. The administrator or the like of the battery system 1 receiving the notification can execute the replacement process.

Figure 11:
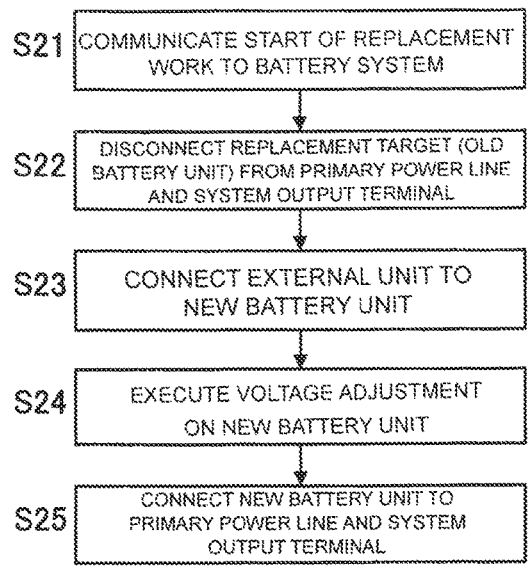
FIG. 11 is a flowchart showing a procedure of replacing a battery unit according to a fourth structure of the present invention.

FIG. 11 is a flowchart showing the replacement procedure. In step S21, a worker executing the replacement operates on an operation panel or the like of the battery system 1 to communicate to the battery system 1 that the replacement work is to be started. The contents of the communication include the information of which battery unit 10 will be replaced. In response to this communication, in step S22, the main controller 20 disconnects the replacement target; that is, the battery unit 10 which is currently assembled in the battery system 1 (hereinafter referred to as "old battery unit 10") from the primary power line ($LL_A$ or $LL_B$) and system output terminals (SO(+) and SO(−)). The disconnection corresponds to switching OFF of the switch $SW_A$ in the series connection structure, and corresponds to switching OFF of the switch $SW_B$ between the battery module 11 of the old battery unit 10 and the primary power line $LL_B$ in the parallel connection structure. In the parallel connection structure, even when the switch $SW_B$ corresponding to the old battery unit 10 is switched OFF, the supply of electric power to the load of the battery system 1 can be continued with (n−1) battery units 10. Alternatively, in place of the switch control of the main controller 20, the switches $SW_A$ or $SW_B$ may be manually switched OFF by the worker. In this case, the communication in step S21 is not necessary.

In step S23 following step S22, the worker assembles a new battery unit 10 with which the old battery unit 10 is to be replaced (hereinafter referred to as "new battery unit 10") in the battery system 1, and connects the external unit 50 to the new battery unit 10. After the connection, in step S24, the new battery unit 10 is handled as the adjustment target battery unit 10, and the voltage adjustment is executed by the external unit 50 for the new battery unit 10. Therefore, the battery module 11 of the new battery unit 10 may also be considered as the adjustment target battery module 11. In the stage of step S23, communication between the new battery unit 10 and the main controller 20 is possible, but the switch $SW_A$ or the switch $SW_B$ between the battery module 11 of the new battery unit 10 and the primary power line $LL_B$ is maintained in the OFF state.

In the inter-module voltage adjustment of step S24, the adjustment unit 51 charges or discharges the adjustment target battery module 11 so that the module voltage $Vmod_{TG}$ of the adjustment target battery module 11 coincides with the objective module voltage. Alternatively, the adjustment target battery module 11 may be charged or discharged so that $SOCmod_{TG}$ which is the module SOC of the adjustment target battery module 11 coincides with the objective module SOC. Prior to the charging or discharging, the main controller 20 may set the objective module voltage based on the module voltages immediately before execution of the voltage adjustment of step S24, or may set the objective module SOC based on the module SOCs immediately before execution of the voltage adjustment of step S24, and may transmit the set objective module voltage or set objective module SOC to the new battery unit 10. For example, the main controller 20 may set an average of the module voltages of the battery units 10 other than the new battery unit 10 (that is, (n−1) battery units 10) as the objective module voltage, and may set an average of module SOCs of the battery units 10 other than the new battery unit 10 (that is, (n−1) battery units 10) as the objective module SOC.

During the execution of the inter-module voltage adjustment, the main controller 20 or the unit controller 12 of the adjustment target battery unit 10 monitors the $Vmod_{TG}$ or the $SOCmod_{TG}$ of the adjustment target battery module 11. The adjustment unit 51 stops charging or discharging of the adjustment target battery module 11 at the timing when the module voltage $Vmod_{TG}$ has reached the objective module voltage or at the timing when the $SOCmod_{TG}$ of the adjustment target battery module 11 has reached the objective module SOC, and thus completes the inter-module voltage adjustment. Alternatively, a configuration may be employed in which, in step S24, in addition to the inter-module voltage adjustment, the in-module voltage adjustment is executed for the new battery unit 10.

The completion of the voltage adjustment in step S24 is recognized by or transmitted to the unit controller 12 of the new battery unit 10 and the main controller 20, and, in step S25 after the completion of the voltage adjustment, the unit controller 12 of the new battery unit 10 or the main controller 20 connects the battery module 11 of the new battery unit 10 to the primary power line ($LL_A$ or $LL_B$) and system output terminals (SO(+) and SO(−)). In other words, in the series connection structure, the switch $SW_A$ is switched ON, and, in the parallel connection structure, the switch $SW_B$ between the battery module 11 of the new battery unit 10 and the primary power line $LL_B$ is switched ON. Alternatively, the switching from the OFF state to the ON state of the switch $SW_A$ or $SW_B$ may be manually executed by the worker.

Figure 12:
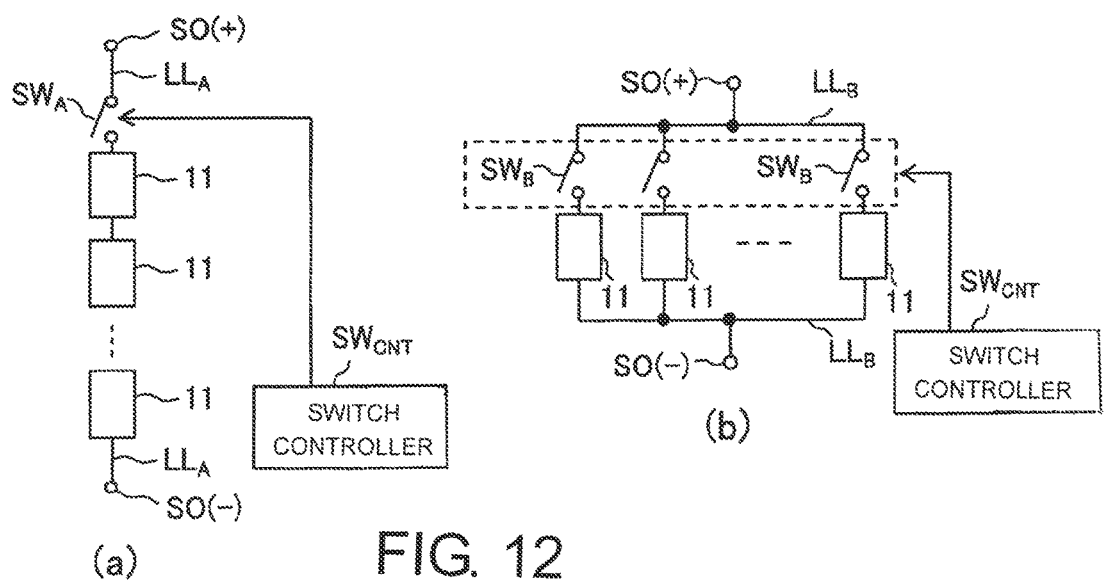
FIGS. 12(a) and 12(b) are diagrams showing relationships among a plurality of battery modules, a switch, and a switch controller.

As is understood from the above description, in the battery system 1, in addition to the system output terminals (SO(+) and SO(−)) for guiding the output electric power of the battery modules 11 to the side of the load, switch units interposed between the battery modules 11 and the system output terminals and a switch controller $SW_{CNT}$ for controlling the switch units may be provided (refer to FIGS. 12(a) and 12(b)). In the series connection structure, the switch unit includes the switch $SW_A$, and, in the parallel connection structure, the switch unit includes a plurality of switches $SW_B$. The switch controller $SW_{CNT}$ for controlling the switching between the ON and OFF states of the switch $SW_A$ or each switch $SW_B$ may be considered as existing within the unit controller 12 or the main controller 20, or as being realized by at least one of the unit controller 12 and the main controller 20.

When a battery module 11 or a battery unit 10 serving as a replacement target is to be replaced with a new battery module 11 or a new battery unit 10, the switch controller $SW_{CNT}$ can control the switch unit to disconnect the replacement target and the system output terminals (step S22), and, after the voltage adjustment is executed for the new battery module (step S24), the switch controller $SW_{CNT}$ can control the switch unit to connect the new battery module to the system output terminals (step S25). By executing such a procedure including the voltage adjustment, the operation of the battery system 1 can be re-started in a state where the voltages are balanced.

During transporting of the battery unit 10, in consideration of safety, the module SOC of the battery unit 10 is preferably set at a low module SOC (in other words, the module voltage of the battery unit 10 is preferably set at a low voltage). When the module SOC and the module voltage of the new battery unit 10 during the transportation are sufficiently low, in step S24, the battery module 11 of the new battery unit 10 is charged as the inter-module voltage adjustment. Therefore, when it is known that the module SOC and the module voltage of the new battery unit 10 during the transportation are sufficiently low, it is sufficient that the module voltage adjustment unit 51 (refer to FIG. 6) has only the charging function.

<<Fifth Structure>>

Figure 13:
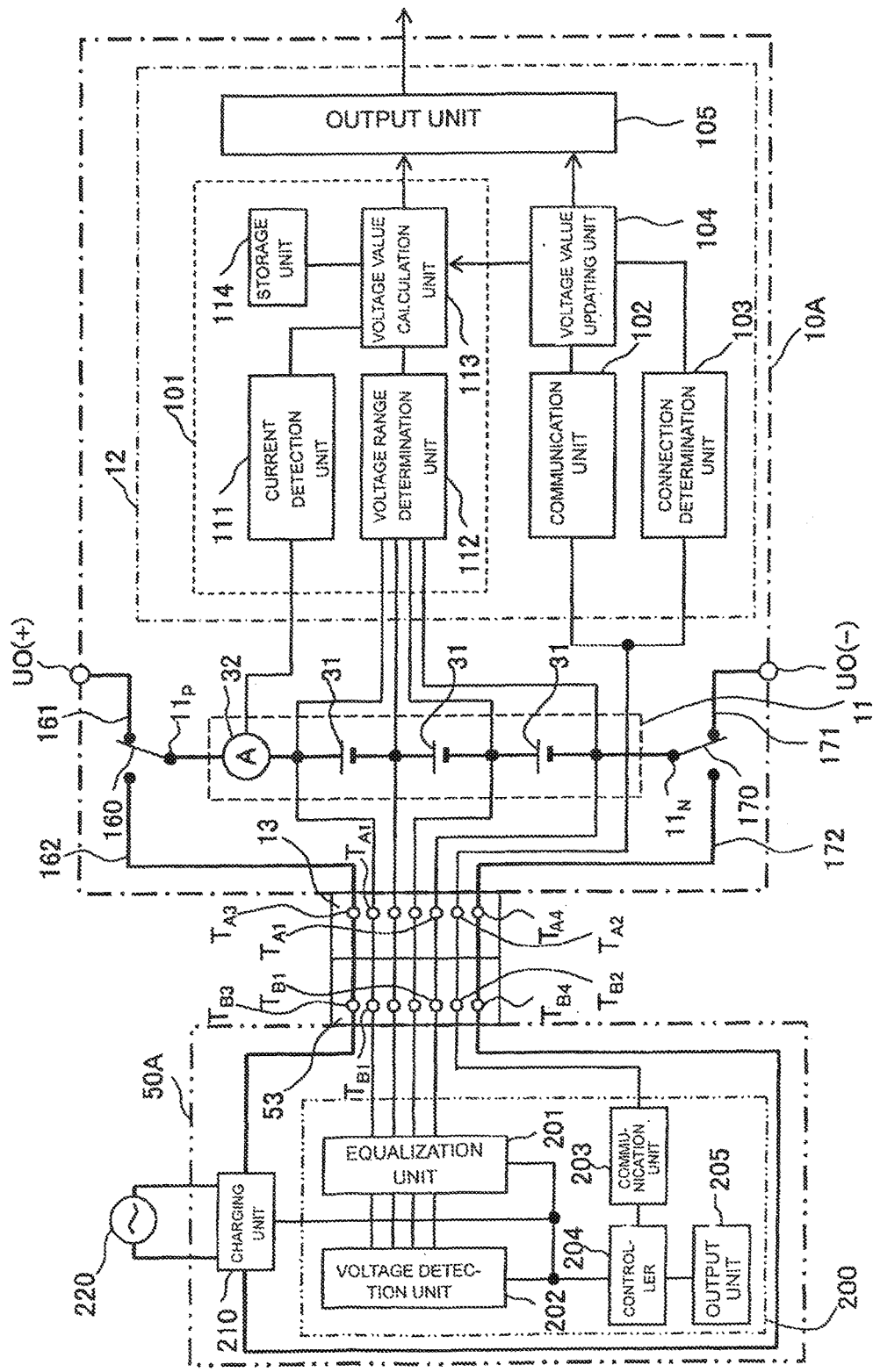
FIG. 13 is an internal structural diagram of a battery unit and an external unit according to a fifth structure of the present invention.

A fifth structure will now be described. FIG. 13 is an internal structural diagram of a battery unit 10A serving as an example of the battery unit 10 and an external unit 50A serving as an example of the external unit 50. The external unit 50A has a function as a charger, and may be called a charger. In FIG. 13, the external unit 50A is connected to the battery unit 10A.

In the battery unit 10A, in addition to the battery module 11, the unit controller 12, and the connector 13, switches 160 and 170, and a pair of unit output terminals UO(+) and UO(−) are provided. The unit controller 12 of the battery unit 10A includes components referred to by reference numerals 101-105. A processor 101 comprises components referred to by reference numerals 111-114. The external unit 50A comprises a charge control device 200 and a charging unit 210 in addition to the connector 53. To the charging unit 210, an electric power source 220 such as a commercial AC electric power is connected. The charge control device 200 comprises components referred to by reference numerals 201-205. In the example structure of FIG. 13, a number m of the battery cells 31 in the battery module 11 is 3, but the number m is not limited to such a number, and may be any integer greater than or equal to 2.

In the connector 13 of the battery unit 10A, (m+1) terminals $T_{A1}$ for equalization, a terminal $T_{A2}$ for communication, and terminals $T_{A3}$ and $T_{A4}$ for charging and discharging the battery module 11 are provided. In the connector 53 of the external unit 50A, (m+1) terminals $T_{B1}$ for equalization, a terminal $T_{B2}$ for communication, and terminals $T_{B3}$ and $T_{B4}$ for charging and discharging the battery module 11 are provided. By the connection of the connector 13 and the connector 53, the external unit 50A is connected to the battery unit 10A. Upon the connection of the connectors 13 and 53, the (m+1) terminals $T_{A1}$ are electrically connected to the (m+1) terminals $T_{B1}$, respectively, and the terminals $T_{A2}$~$T_{A4}$ are electrically connected to the terminals $T_{B2}$~$T_{B4}$, respectively.

At the battery unit 10A, of the (m+1) terminals $T_{A1}$, m terminals $T_{A1}$ are connected to positive electrode terminals of m battery cells 31, respectively, and the remaining terminal $T_{A1}$ is connected to a negative electrode terminal of the battery cell 31 on a side of the lowest potential (that is, the battery cell 31[m] of FIG. 8). The communication terminal $T_{A2}$ is connected to a communication unit 102 and a connection determination unit 103. The terminals $T_{A3}$ and $T_{A4}$ are connected to lines 162 and 172 in the battery unit 10A, respectively. In the external unit 50A, the m terminals $T_{B1}$ are connected to an equalization unit 201 and a voltage detection unit 202, and the communication terminal $T_{B2}$ is connected to a communication unit 203. The terminals $T_{B3}$ and $T_{B4}$ are connected to each other via the charging unit 210.

Under a switching control of the switches 160 and 170, a positive output terminal $11_P$ of the battery module 11 is selectively connected to a line 161 or the line 162 via the switch 160, and a negative output terminal $11_N$ of the battery module 11 is selectively connected to a line 171 or the line 172 via the switch 170. The unit controller 12 can execute the switching control of the switches 160 and 170. Alternatively, the switching control may be executed under the control of the main controller 20 connected to the battery unit 10A. The lines 161 and 171 are connected to the unit output terminals UO(+) and UO(−), respectively, and can connect the unit output terminals UO(+) and UO(−) to the system output terminals SO(+) and SO(−) directly or via one or more other battery modules 11.

In the above description with respect to the series connection structure referring to FIG. 4 (a), it has been described that the switch $SW_A$ may be provided between the adjacent battery modules 11. In the series connection structure, the switches 160 and 170 are constituent elements of the switch $SW_A$ between adjacent battery modules 11. In the parallel connection structure, the switches 160 and 170 are constituent elements of the switch $SW_B$. When the terminals $11p$ and $11_N$ are connected to the lines 161 and 171, the battery module 11 of the battery unit 10A is connected to the primary power line $LL_A$ or $LL_B$, and, when the terminals $11_P$ and $11_N$ are connected to the lines 162 and 172, the battery unit 10A is disconnected from the primary power line $LL_A$ or $LL_B$. Therefore, the unit controller 12 controls the switches 160 and 170 under the control of the main controller 20 when it is determined that the above-described voltage adjustment is necessary for the battery unit 10A, or when the battery unit 10A is a replacement target, so that the terminals $11_P$ and $11_N$ are connected to the lines 162 and 172. The process to connect the terminals $11_P$ and $11_N$ to the lines 162 and 172 corresponds to the process of step S12 of FIG. 10 or the process of step S22 of FIG. 11. The process to then return the lines to be connected to the terminals $11_P$ and $11_N$ from the lines 162 and 172 to the lines 161 and 171 corresponds to the process of step S14 of FIG. 10 or the process of step S25 of FIG. 11.

Upon the connection of the external unit 50A and the battery unit 10A, the voltage detection unit 202 can detect a voltage between a plurality of terminals $T_{B1}$, and, consequently, can detect the cell voltages of the battery cells 31. When the external unit 50A and the battery unit 10A are connected, the controller 204 uses a detection result of the voltage detection unit 202 to detect that the battery unit 10A is connected to the external unit 50A, and, in response, the communication unit 203 can transmit to the connection determination unit 103 of the battery unit 10A a connection signal indicating that the battery unit 10A is connected to the external unit 50A. The connection determination unit 103 can determine whether or not the external unit 50A is connected to the battery unit 10A based on the presence/absence of reception of the connection signal. Alternatively, a mechanical or electrical switch which is activated when the battery unit 10A and the external unit 50A are connected may be provided on the external unit 50A or on the battery unit 10A, and the above-described determination by the connection determination unit 103 may be executed in response to the activation of this switch.

The unit controller 12 may maintain the connection of the terminals $11_P$ and $11_N$ to the lines 161 and 171 in the normal state, but when the connection determination unit 103 determines that the external unit 50A is connected to the battery unit 10A, the unit controller 12 may connect the terminals $11_P$ and $11_N$ to the lines 162 and 172 as necessary.

In the following description of the fifth structure, a configuration is considered in which the external unit 50A is connected to the battery unit 10A. Arbitrary information and signals can be communicated between the communication units 203 and 102.

The charge control device 200 of the external unit 50A will now be described. The equalization unit 201 can handle the battery unit 10A as an adjustment target battery unit, and can execute the equalization process to equalize the cell voltages of the battery cells 31 in the battery module 11. As the structure and method for the equalization process, known structures and methods (for example, those of International Publication No. WO/2011/105083) may be used. For example, a circuit which connects the adjacent terminals $T_{B1}$ through a resistor and a switch is provided in the equalization unit 201. Then, for example, in the equalization process, the controller 204 controls the switch of the equalization unit 201, to discharge one or more battery cells 31 through the equalization unit 201 until the values of the cell voltages detected by the voltage detection unit 202 are equal to each other. The communication unit 203 may transmit to the communication unit 102 the values of the cell voltages detected by the voltage detection unit 202 as updating voltage information. An output unit 205 includes a display device such as a liquid crystal display device. The controller 204 can display the cell voltages on the output unit 205.

The unit controller 12 of the battery unit 10A will now be described. A current detection unit 111 calculates a value of current flowing in the battery module 11 based on an output signal of the current sensor 32 according to a charging or discharging current value of the battery module 11. A voltage range determination unit 112 determines to which voltage range among a plurality of voltage ranges determined in advance each cell voltage belongs. The determination unit 112 may execute the determination through a known method (including the method described in International Publication No. WO/2011/105083), and, for example, the determination may be made based on a comparison between each cell voltage and one or more predetermined reference voltages. The determination unit 112 is also one type of a voltage detection unit. In the present structure, a minimum detection unit (resolution) in the voltage detection by the determination unit 112 is larger than that of the voltage detection unit 202.

A voltage value calculation unit 113 can calculate or estimate the SOC, open circuit voltage, and cell voltage of each battery cell 31 based on the current value calculated by the current detection unit 111 and an integrated value of the current value, using a known method (including the method described in International Publication No. WO/2011/105083), can also correct the estimated cell voltage based on the determination result of the voltage range determination unit 112, and can also correct the SOC and open circuit voltage of the battery cell 31 based on the corrected cell voltage. A storage unit 114 can store the SOC or the like determined by the voltage value calculation unit 113. An output unit 105 can include the corrected cell voltage or open circuit voltage of each battery cell 31 and the corrected SOC of each battery cell in the cell voltage information and the cell SOC information, and can output the resulting information to the main controller 20 (refer to FIG. 5). In addition, the output unit 105 can determine the module voltage based on the corrected cell voltage or open circuit voltage of each battery cell 31, can determine the module SOC based on the corrected SOC of each battery cell 31, can include the determined module voltage and module SOC in the module voltage information and module SOC information, and can output the resulting information to the main controller 20 (refer to FIG. 5).

As a specific example, the current detection unit 111, the voltage range determination unit 112, the voltage value calculation unit 113, and the storage unit 114 may be operated in the following manner.

When charging or discharging of the battery module 11 is started, the voltage value calculation unit 113 resets the current integration value which is an integrated value of the current value calculated by the current detection unit 111 (that is, substitutes the current integration value with zero), and reads the SOC of each battery cell 31 from the storage unit 114. The SOC which is read in this process corresponds to the SOC of each battery cell immediately before the start of charging or discharging of the battery module 11. After the charging or discharging of the battery module 11 is started, the voltage value calculation unit 113 can calculate the SOC of current point of each battery cell 31 based on the read SOC of each battery cell 31 and the current integration value, can estimate the open circuit voltage at the current point of each battery cell 31 based on the calculated SOC, and can estimate the cell voltage at the current point of each battery cell 31 based on the estimated open circuit voltage and the current value calculated by the current detection unit 111.

The voltage range determination unit 112 can compare, for each battery cell 31, the voltage between the positive electrode terminal and the negative electrode terminal of the battery cell 31 with a plurality of predetermined reference voltages including reference voltages Vref1 and Vref2, to determine to which voltage range each cell voltage belongs (Vref1<Vref2). The reference voltages Vref1 and Vref2 are a lower limit voltage and an upper limit voltage of a certain voltage range (hereinafter referred to a "specific voltage range"), respectively. The voltage value calculation unit 113 can correct each cell voltage, each open circuit voltage, and each SOC which are estimated or calculated, based on the determination result of the voltage range determination unit 112, and, after the correction, the voltage value calculation unit 113 can reset the current integration value.

For example, when the voltage between the positive electrode terminal and the negative electrode terminal of the battery cell 31 is less than the reference voltage Vref1, the voltage value calculation unit 113 estimates the cell voltage of the battery cell 31 based on the current integration value in the voltage range of less than the reference voltage Vref1. If, at a certain timing, the voltage between the positive electrode terminal and the negative electrode terminal of the battery cell 31 changes from a state of less than the reference voltage Vref1 to a state of greater than or equal to the reference voltage Vref1 (that is, when the voltage transitions from the voltage range of less than Vref1 to the specific voltage range), the voltage value calculation unit 113 receives information indicating the change from the voltage range determination unit 112, can correct the cell voltage at the current point of the battery cell 31 to the reference voltage Vref1, and can correct the open circuit voltage and SOC at the current point based on the corrected cell voltage. Further, at the specific timing described above, the voltage value calculation unit 113 can reset the current integration value, use the current integration value starting at the specific timing, and re-start the estimation of the cell voltage or the like in the specific voltage range.

When the voltage between the positive electrode terminal and the negative electrode terminal of the battery cell 31 changes from a state of less than the reference voltage Vref2 to a state of greater than or equal to the reference voltage Vref2 after the specific timing also, or when the voltage between the positive electrode terminal and the negative electrode terminal of the battery cell 31 changes from a state of greater than or equal to the reference voltage Vref1 again to a state of less than the reference voltage Vref1 after the specific timing also, processes similar to the above including the correction of the cell voltage and reset of the current integration value may be executed. When charging or discharging of the battery module 11 is stopped due to stopping of operation of the load of the battery system 1 or the like, the storage unit 114 can store the SOC of each battery cell 31 calculated by the voltage value calculation unit 113 at that point.

When the communication unit 102 receives the updating voltage information from the communication unit 203, a voltage value updating unit 104 can update the cell voltage determined by the voltage value determination unit 112 (which may be the cell voltage after the above-described correction is applied) based on the cell voltage included in the updating voltage information (in a simple method, the cell voltage is replaced with the cell voltage included in the updating voltage information). As a method of update, a known method (such as the method of International Publication No. WO/2011/105083) may be employed. After the update, the voltage value calculation unit 113 may update the open circuit voltage and the SOC of each battery cell 31 using the updated cell voltage. Further, after the update, the voltage value calculation unit 113 may reset the current integration value and re-start the estimation of the cell voltage using the current integration value or the like starting from the point when the update is done. Such an updating process may be executed every time the external unit 50 is connected to the battery unit 10A. The output unit 105 may include the updated cell voltage or open circuit voltage of each battery cell 31 and the updated SOC of each battery cell 31 in the cell voltage information and cell SOC information, and output the resulting information to the main controller 20 (refer to FIG. 5). In addition, the output unit 105 may determine the module voltage based on the updated cell voltage or open circuit voltage of each battery cell 31, can determine the module SOC based on the updated SOC of each battery cell 31, can include the determined module voltage and module SOC in the module voltage information and the module SOC information, and can output the resulting information to the main controller 20 (refer to FIG. 5).

An example method of inter-module voltage adjustment for the battery unit 10A will now be described. When the inter-module voltage adjustment is to be executed for the battery unit 10A, the main controller 20 outputs a predetermined first request signal to the unit controller 12 of the battery unit 10A. The first request signal includes the values of the objective module voltage or the objective module SOC determined as described above. The unit controller 12 receives the first request signal, controls the switches 160 and 170 to connect the terminals $11_P$ and $11_N$ to the lines 162 and 172, and outputs a second request signal to the controller 204 of the external unit 50A through the communication units 102 and 203. The controller 204 receives the second request signal, and controls the charging unit 210. The charging unit 210 under this control charges the battery module 11 by a DC electric power based on the output electric power of the electric power source 220. In this process, the unit controller 12 monitors the module voltage or the module SOC which is based on the cell voltages or cell SOCs determined using the processor 101 or the voltage detection unit 202, and causes the charging by the charging unit 210 to be stopped through the communication unit 102, the communication unit 203, and the controller 204 when the module voltage has reached the objective module voltage or when the module SOC has reached the objective module SOC (the inter-module voltage adjustment is completed with this stopping of charging).

In the example structure of FIG. 13, a configuration is considered in which the module voltage or the module SOC of the battery unit 10A for which the inter-module voltage adjustment is to be executed is always lower than the objective module voltage or the objective module SOC. When a configuration is considered in which the module voltage or the module SOC of the battery unit 10A for which the inter-module voltage adjustment is to be executed is always higher than the objective module voltage or the objective module SOC, the charging unit 210 may be replaced with a discharging unit for discharging the battery module 11. When the relationship between the module voltage or the module SOC of the battery unit 10A for which the inter-module voltage adjustment is to be executed and the objective module voltage or the objective module SOC is indefinite, both the charging unit 210 and the discharging unit may be provided in the external unit 50A.

The part of the battery unit 10A which includes the processor 101 and the voltage value updating unit 104 is an example of the voltage detection unit 35 and the SOC detection unit 36 of FIG. 5. With the use of the processor 101, although the voltage detection precision becomes relatively coarse, the cell voltages can be detected with a simple structure. On the other hand, the voltage detection precision of the voltage detection unit 202 of the external unit 50A is higher than that of the processor 101. Therefore, by employing a configuration where the external unit 50A is connected to the battery unit 10A as necessary and the above-described updating is executed, it is possible to inhibit accumulation of errors in voltage detection by the battery unit 10 alone.

The part of the external unit 50A including the charging unit 210 and the discharging unit (not shown) is an example of the inter-module voltage adjustment unit of FIG. 6, and the part of the external unit 50A including the equalization unit 201 is an example of the in-module voltage adjustment unit 52 of FIG. 6. Similar to the option of omitting one of the adjustment units 51 and 52 from the external unit 50 of FIG. 6, the charging unit 210 or the discharging unit may be omitted from the external unit 50A of FIG. 13, or the equalization unit 201 may be omitted from the external unit 50A of FIG. 13.

An example operation of the structure of FIG. 13 has been described looking in particular into the method of the in-module voltage adjustment and the inter-module voltage adjustment. Alternatively, regardless of whether or not the voltage adjustments are executed, the external unit 50A may be connected to the battery unit 10A and the terminals 11$_P$ and 11$_N$ may be connected to the lines 162 and 172, so that the battery module 11 can be charged by the charging unit 210 as much as necessary.

<<Sixth Structure>>

Figure 14:
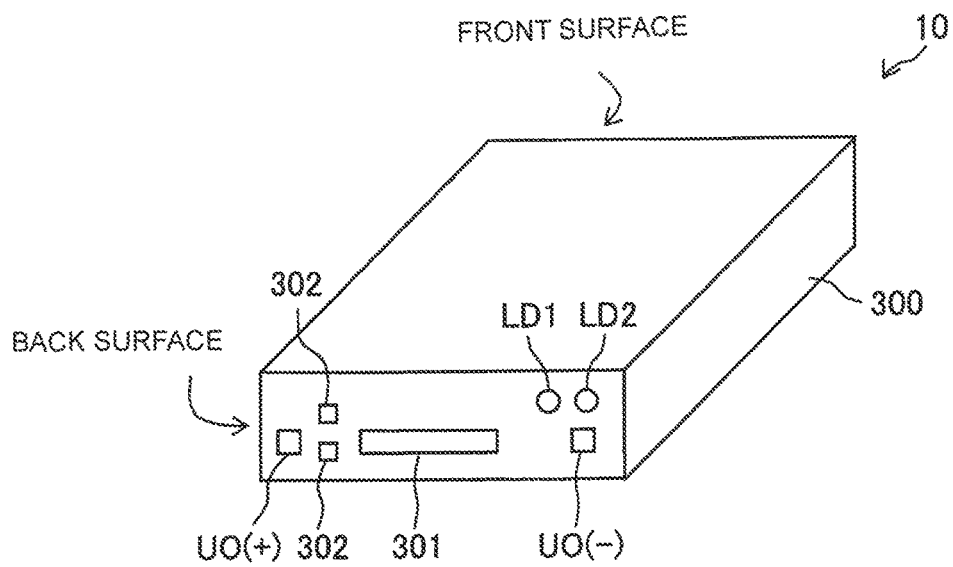
FIG. 14 is a perspective view of an outer appearance of a battery unit according to a sixth structure of the present invention.

A sixth structure will not be described. In the sixth structure, the structure or the like of the battery unit 10 will be described. FIG. 14 is a perspective view of an outer appearance of the battery unit 10. The battery unit 10 has a housing 300 having an approximate rectangular parallelepiped shape (however, the shape of the housing 300 may be an arbitrary shape). Electrical components forming the battery unit 10 are provided in or on the housing 300. Six surfaces of the rectangular parallelepiped functioning as the housing 300 include a front surface and a back surface which oppose each other.

Figure 15:
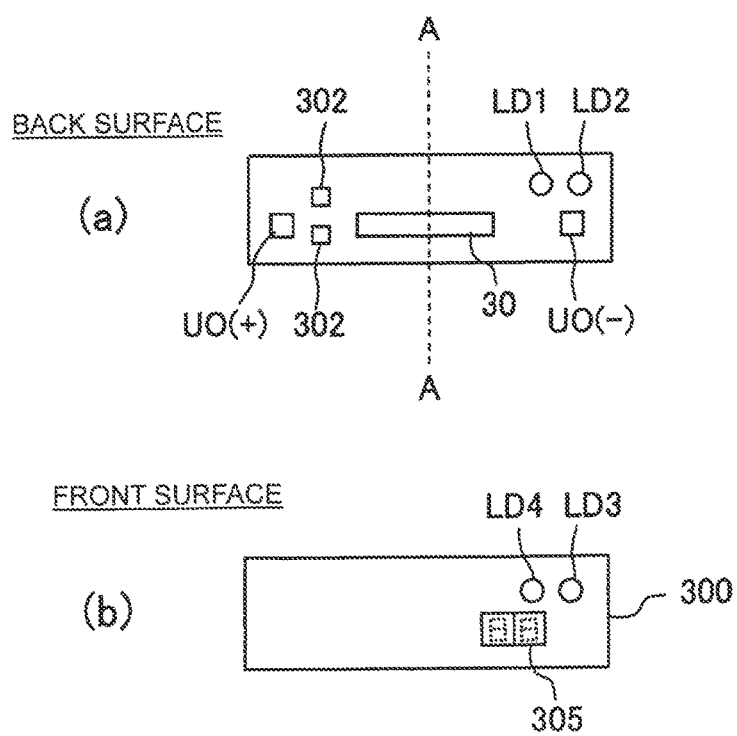
FIG. 15(a) is a plan view of the battery unit according to the sixth structure of the present invention, viewed from a back side.
FIG. 15(b) is a plan view of the battery unit according to the sixth structure of the present invention, viewed from a front side.
Figure 16:
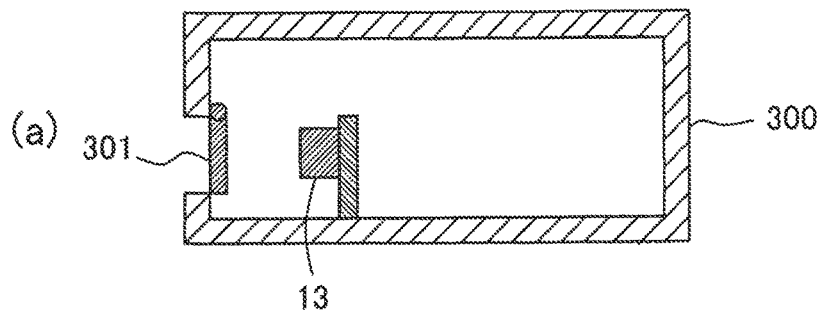
FIGS. 16(a) and 16(b) are cross sectional diagrams of the battery unit according to the sixth structure of the present invention.
Figure 16:
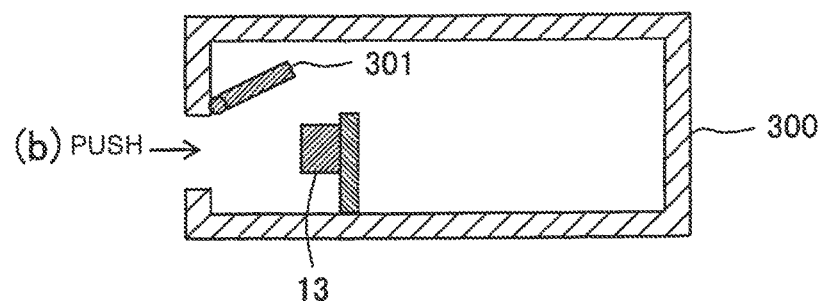

FIGS. 15(*a*) and 15(*b*) are plan views of the battery unit 1 viewed from directions opposing the back surface and the front surface of the housing 300, respectively. On a back surface of the housing 300, a connector insertion unit 301 and one or more external communication terminals 302 (two external communication terminals in the example structure of FIG. 15(*a*)) are provided, as are the light-emitting units LD1 and LD2 described above (refer to FIG. 9) and the unit output terminals UO(+) and UO(−) to be connected in series to the battery module 11. FIG. 16(*a*) is a cross sectional view of the battery unit 10 taken along line A-A of FIG. 15(*a*). In the cross sectional views of FIGS. 16(*a*) and 16(*b*), only portions of the constituent elements of the battery unit 10 are shown. The connector insertion unit 301 functions as a lid for preventing exposure of the connector 13, and is normally closed. As shown in FIG. 16 (*b*), by pushing the connector insertion unit 301 in a direction from the back surface toward the front surface, it becomes possible to open the lid (connector insertion unit 301), and to enable the connection between the connector 13 of the battery unit 10 and the connector 53 of the external unit 50. By connecting the external communication terminal 302 to another block (for example, the main controller 20) via a communication line (not shown), it becomes possible to communicate between the unit controller 12 and the other block (for example, the main controller 20).

As shown in FIG. 15(*b*), on a front surface of the housing 300, light emitting units LD3 and LD4 similar to the light emitting units LD1 and LD2 are provided, along with a display unit 305 made of a 7-segment display or the like. When the unit controller 12 determines that some maintenance (for example, the replacement work described above in connection with the fourth structure) is necessary for the battery unit 10 including the unit controller 12 itself, the unit controller 12 can cause the light emitting unit LD3 to blink or the like, to thereby output permission of the connection of the external unit 50 to the battery unit 10 including the unit controller 12 (as one form of the output, for example, the necessity of the maintenance may be reported to the outside). In addition, the unit controller 12 reports to the outside that the battery module 11 corresponding to the unit controller 12 is being charged or discharged, by light emission of the light emitting unit LD4 or the like. Moreover, the unit controller 12 can display on the display unit 305 the SOC or the like of the battery module 11 corresponding to the unit controller 12.

Figure 17:
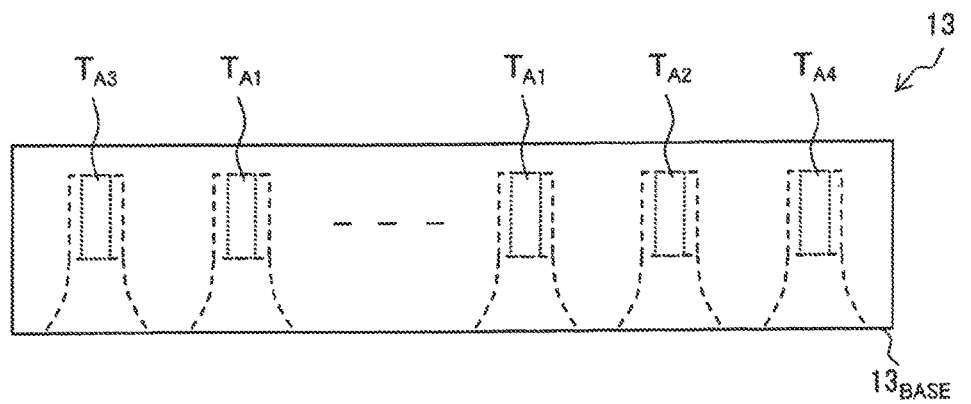
FIG. 17 is a plan view showing a structure of a connector of a battery unit and a connector of an external unit according to the sixth structure of the present invention.
Figure 17:
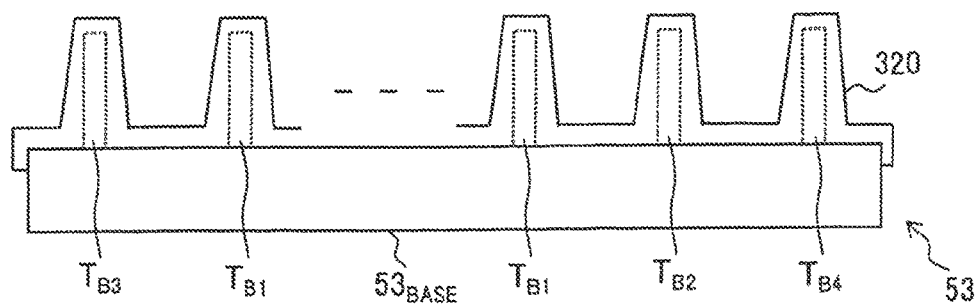
Figure 18:
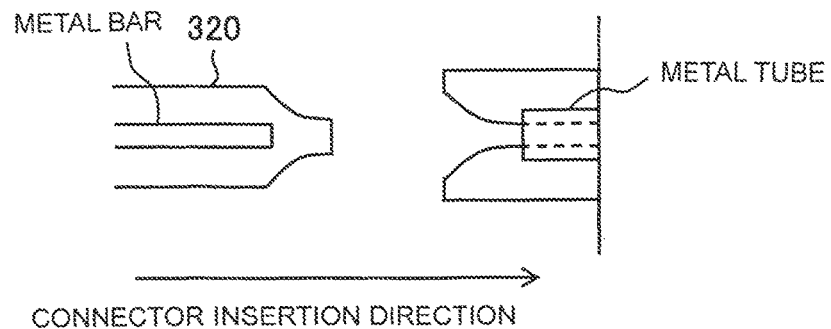
FIG. 18 is a partial structural image diagram of a connector of a battery unit and a connector of an external unit according to the sixth structure of the present invention.

FIG. 17 is a plan view showing structures of the connector 13 of the battery unit 10 and the connector 53 of the external unit 50. A plurality of holes are formed in a resin base 13$_{BASE}$ having an approximate rectangular parallelepiped shape, and a plurality of metal tubes corresponding to the terminals $T_{A2}$~$T_{A4}$ and two or more terminals $T_{A1}$ are provided in the plurality of holes, to form the connector 13. Meanwhile, the connector 53 includes a resin base 53$_{BASE}$ having an approximate rectangular parallelepiped shape, a plurality of metal bars protruding from the resin base 53$_{BASE}$ toward the insertion direction of the connector 53, and a cover unit 320 covering the plurality of metal bars, and the plurality of metal bars correspond to the terminals $T_{B2}$~$T_{B4}$ and two or more terminals $T_{B1}$. FIG. 18 is an image diagram of the peripheral structure of one metal tube and one metal bar. When no external force is applied on the connector 53, the terminals $T_{B1}$~$T_{B4}$ are covered with the cover unit 320, and are not exposed. When an external force for connecting the connector 53 to the connector 13 is applied on the connector 53, the terminals $T_{B1}$~$T_{B4}$ are exposed from the cover unit 320 by a spring mechanism (not shown), and the terminals $T_{B1}$~$T_{B4}$ are connected to the terminals $T_{A1}$~$T_{A4}$.

Figure 19:
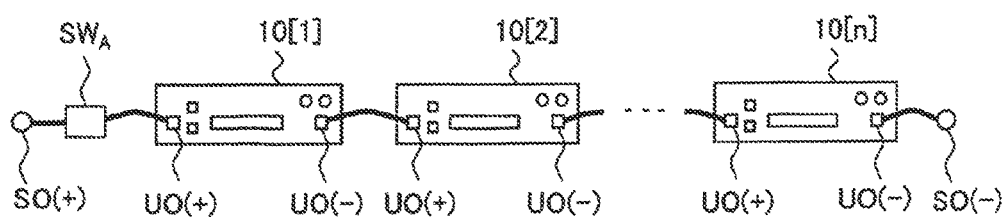
FIG. 19 is a diagram showing an example connection structure of a plurality of battery units according to the sixth structure of the present invention.

When the series connection structure is employed, the switch $SW_A$ may be stored inside the battery unit 10, or the switch $SW_A$ may be provided outside of the battery unit 10. In this case, as shown in FIG. 19, in order to connect the unit output terminal UO(−) of the battery unit 10[*i*] and the unit output terminal UO(+) of the battery unit 10[*i*+1], the battery units 10[1]~10[*n*] are connected in series through a cable, and one switch $SW_A$ may be provided between the terminal UO(+) of the battery unit 10[1] and the system output terminal (+) or between the terminal UO(−) of the battery unit 10[*n*] and the system output terminal (−) (FIG. 19 employs the former structure). With such a structure, the number of necessary switches $SW_A$ may be inhibited to one. Alternatively, the switch $SW_A$ may be provided between the terminal UO(−) of the battery unit 10[*i*] and the terminal UO(+) of the battery unit 10[*i*+1]. In the parallel connection structure also, the switch $SW_B$ may be provided inside each battery unit 10 or outside of each battery unit 10.

<<Seventh Structure>>

Figure 20:
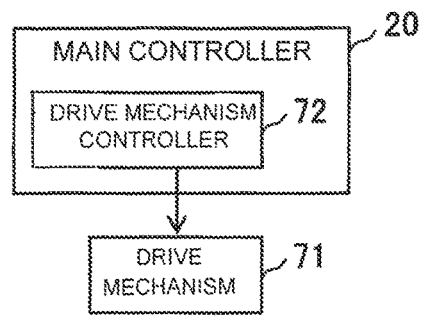
FIG. 20 is a partial block diagram of a battery system according to a seventh structure of the present invention.

A seventh structure will now be described. Another example structure for realizing the connection between the external unit 50 and the battery unit 10 will be described. In this alternative configuration, the connection is realized without the manual operation. For example, as shown in FIG. 20, a drive mechanism 71 which moves the external unit 50 so that, of n battery units 10, the connector 13 of an arbitrary battery unit 10 is connected to the connector 53 of the external unit 50 (that is, a drive mechanism 71 which drives the external unit 50), and a drive mechanism controller 72 which controls the drive mechanism 71 based on a result of determination of the voltage adjustment necessity determination unit 21 may be provided in the battery system 1 (the drive mechanism may alternatively be called a moving mechanism). The drive mechanism controller 72 may be provided in the main controller 20. With such a configuration, the external unit 50 can be connected to a desired battery unit 10 without the need for the manual operation. More specifically, for example, the drive mechanism controller 72 can control the drive mechanism 71 so that the connector 53 of the external unit 50 is connected to the connector 13 of the battery unit 10 for which the determination unit 21 of FIG. 7 determines that the voltage adjustment is necessary. With such a configuration, the voltage adjustment is automatically executed as necessary using the external unit 50 in the course of daily operation, without the need of the manual operation. As a result, the voltage balance among a plurality of battery modules and the voltage balance among a plurality of battery cells 31 can be maintained without burdening the administrator or the like of the battery system 1.

Figure 21:
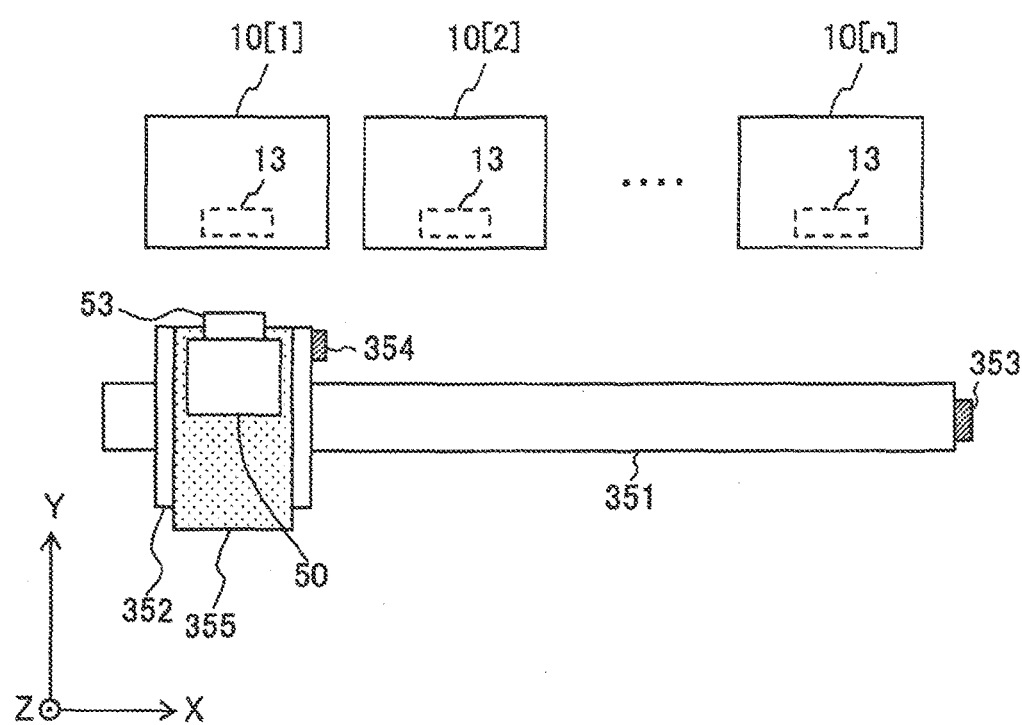
FIG. 21 is a diagram showing a structure of a drive mechanism according to the seventh structure of the present invention.

FIG. 21 shows a specific example configuration. FIG. 21 shows a rail 351, a movable base 352, a drive unit 353, and a drive unit 354 which are specific example constituent elements of the drive mechanism 71, and also shows an outer appearance of the battery units 10[1]~10[*n*] as viewed from above. The X axis and the Y axis are parallel to the horizontal direction, and are orthogonal to each other. The Z axis is parallel to the vertical direction (perpendicular direction). The Z-axis direction corresponds to the height direction. In the example structure of FIG. 21, the battery units 10[1]~10[*n*] are arranged along the X-axis direction, and the external unit 50 is fixed on a slide table 355 of the movable base 352 so that the connector 53 of the external unit 50 protrudes on the side of the battery unit 10. In this configuration, the placement positions of the connectors 13 and 53 in the height direction are set as the same position between the battery units 10[1]~10[*n*] and the external unit 50. A positive Y-axis direction coincides with the insertion direction of the connector 53 with respect to the connector 13, and a negative Y-axis direction coincides with the direction to remove the connector 53 from the connector 13. The drive unit 353 is made of a motor or the like which moves the movable base 352 in the X-axis direction. The slide table 355 mounted on the movable base 352 can be moved in the Y-axis direction on the movable base 352. The drive unit 354 is made of a motor or the like which moves the slide table 355 in the Y-axis direction.

When it is desired to connect the external unit 50 to the battery unit 10[*i*], the drive mechanism controller 72 outputs a movement command signal to the drive unit 353 so that the X-axis position of the external unit 50 can be moved to the X-axis position of the battery unit 10[*i*] without an intervention of humans (manual operation), and then outputs a connection command signal to the drive unit 354 so that the connector 53 can be connected to the connector 13 of the battery unit 10[*i*] without a human intervention (manual operation). When the connection becomes no longer necessary, the drive mechanism controller 72 outputs a connection release command signal to the drive unit 354 so that the connector 53 can be removed from the connector 13 of the battery unit 10[*i*].

When the power capacity of the battery system 1 is relatively low, in particular (for example, when the battery system 1 is used for the purpose of supplying electric power in a housing or the like), of the constituent elements of the external unit 50, the connector 53 and the other constituent elements may be separated, and the connector 53 and the other constituent elements may be connected through a cable. In the above-described example structure, the entirety of the external unit 50 is moved by the drive mechanism 71, but the drive mechanism 71 may be a mechanism which causes only the movement target section which is a part of the external unit 50 to move. With such a configuration, reduction in the electric power necessary for the movement and reduction in the size of the drive mechanism 71 can be expected.

The movement target section includes at least the connector 53. Of the constituent elements of the external unit 50, circuits other than the movement target section may be connected to the movement target section through a cable or the like.

<<Eighth Structure>>

Figure 22:
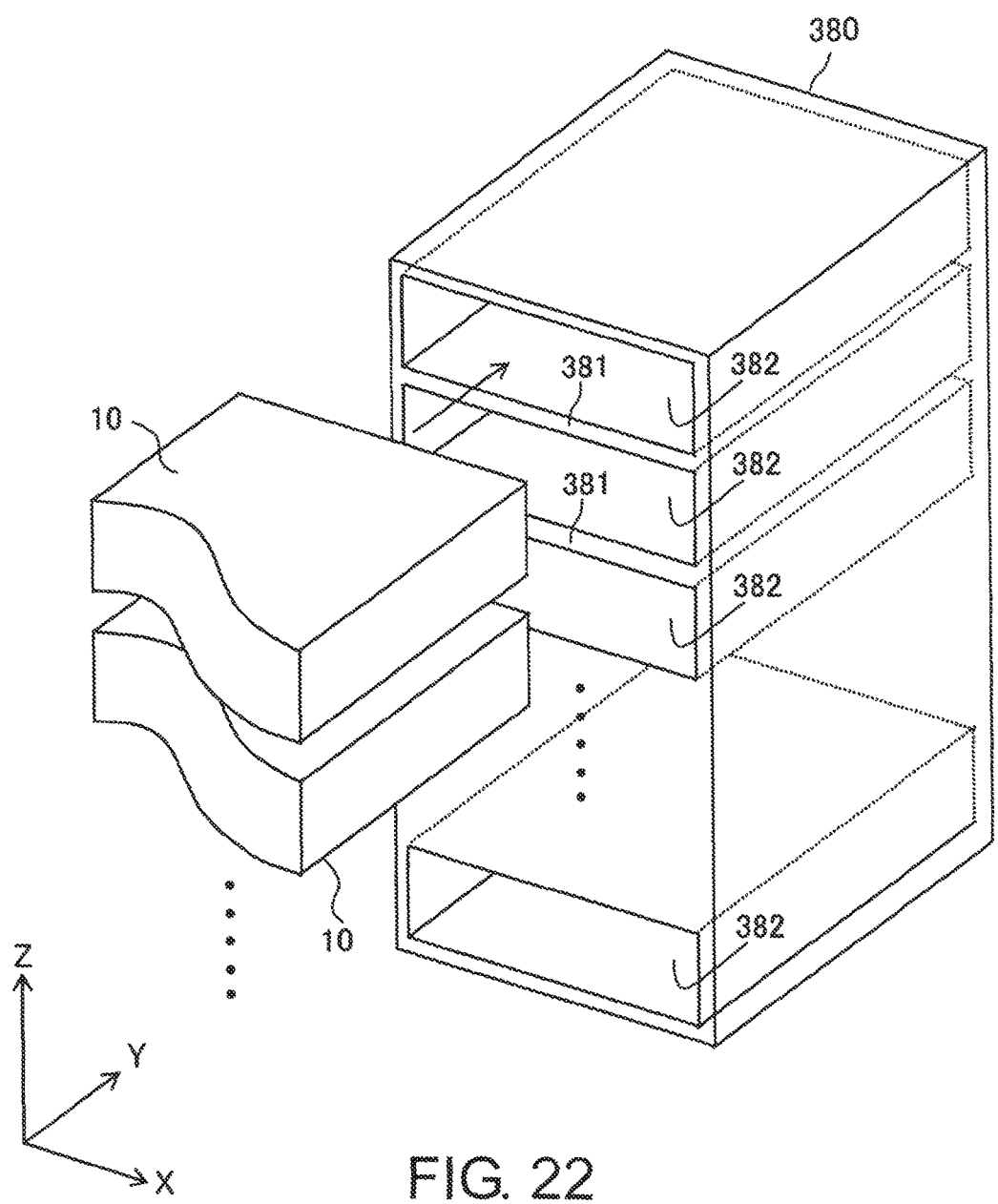
FIG. 22 is a diagram showing storage of a plurality of battery units in a rack according to an eighth structure of the present invention.

An eighth structure will now be described. The arrangement direction of the battery unit 10 is not limited to the horizontal direction, and, alternatively, the battery units 10 may be arranged along a vertical direction. In this case, for example, a rack 380 having a plurality of shelves 381 and a plurality of battery unit storage units 382 as shown in FIG. 22 may be prepared, and the plurality of battery units 10 may be stored in the plurality of battery unit storage units 382. When the rack 380 is formed so that the plurality of storage units 382 are arranged along the vertical direction (Z-axis direction), the plurality of battery units 10 are arranged along the vertical direction (Z-axis direction). When the plurality of battery units 10 are arranged along the vertical direction, the drive mechanism 71 may be formed to allow the external unit 50 to move in the Z-axis direction, in addition to the Y-axis direction. In other words, with reference to the drive mechanism 71 of the seventh structure, the movement of the external unit 50 in the X-axis direction may be replaced with the movement of the external unit 50 in the Z-axis direction.

The configurations of the seventh and eighth structures may be combined to arrange the plurality of battery units 10 in the horizontal and vertical directions. In this case, the drive mechanism 71 may be formed so that the external unit 50 can be moved in the X-axis, Y-axis, and Z-axis directions.

<<Ninth Structure>>

A ninth structure will now be described. When the above-described drive mechanism 71 and drive mechanism controller 72 are provided in the battery system 1, the drive mechanism controller 72 may control the drive mechanism 71 so that the connectors 13 of the plurality of battery units 10 are sequentially connected to the connector 53 of the external unit 50 according to a predetermined schedule. For example, the drive mechanism controller 72 may periodically execute a round connection process to sequentially connect the external unit 50 to the battery units 10[1]~10[n]. In the execution of the round connection process, when the external unit 50 is connected to the battery unit 10[i], the voltage adjustment necessity determination unit 21 may determine the necessity of the voltage adjustment for the battery unit 10[i]. If it is determined in this process that the voltage adjustment is necessary for the battery unit 10[i], the above-described voltage adjustment may be applied to the battery unit 10[i]. In this manner, the drive mechanism controller 72 can connect the external unit 50 to the battery unit 10 for which the voltage adjustment is necessary, during the execution of the round connection process.

By enabling such a round connection process, it is possible to automatically execute the voltage adjustment using the external unit 50 in the course of daily operation without the need for the manual operation. As a result, the voltage balance among a plurality of battery modules 11 and the voltage balance among a plurality of battery cells 31 can be maintained while not burdening the administrator of the battery system 1 or the like.

In the execution of the round connection process, if the voltage adjustment necessity determination unit 21 of FIG. 7 determines that a battery unit 10 requires the voltage adjustment, the drive mechanism controller 72 may interrupt the round connection process, and may connect the external unit 50 to the battery unit 10 determined to require the voltage adjustment, using the drive mechanism 71.

In addition, under an assumption that each battery unit 10 has the structure of the battery unit 10A of FIG. 13 and the external unit 50 has the structure of the external unit 50A of FIG. 13, when the external unit 50 is connected to the battery unit 10[i] in the execution of the round connection process, the battery unit 10[i] may receive the above-described updating voltage information from the external unit 50A, and the voltage value updating unit 104 of the battery unit 10[i] may update the voltage value as described above. In the battery unit 10A of FIG. 13, the voltage detection precision is relatively coarse in order to achieve simplification of the voltage detection structure, and thus, the detection error may accumulate. However, by employing a configuration where the battery unit 10A, for example, periodically receives the updating voltage information from the external unit 50A, it is possible to inhibit such an accumulation of the detection error. Alternatively, the voltage detection unit 35 (refer to FIG. 5) having a necessary detection precision may be provided in the battery unit 10, in which case the above-described updating process is not necessary.

<<Tenth Structure>>

Figure 23:
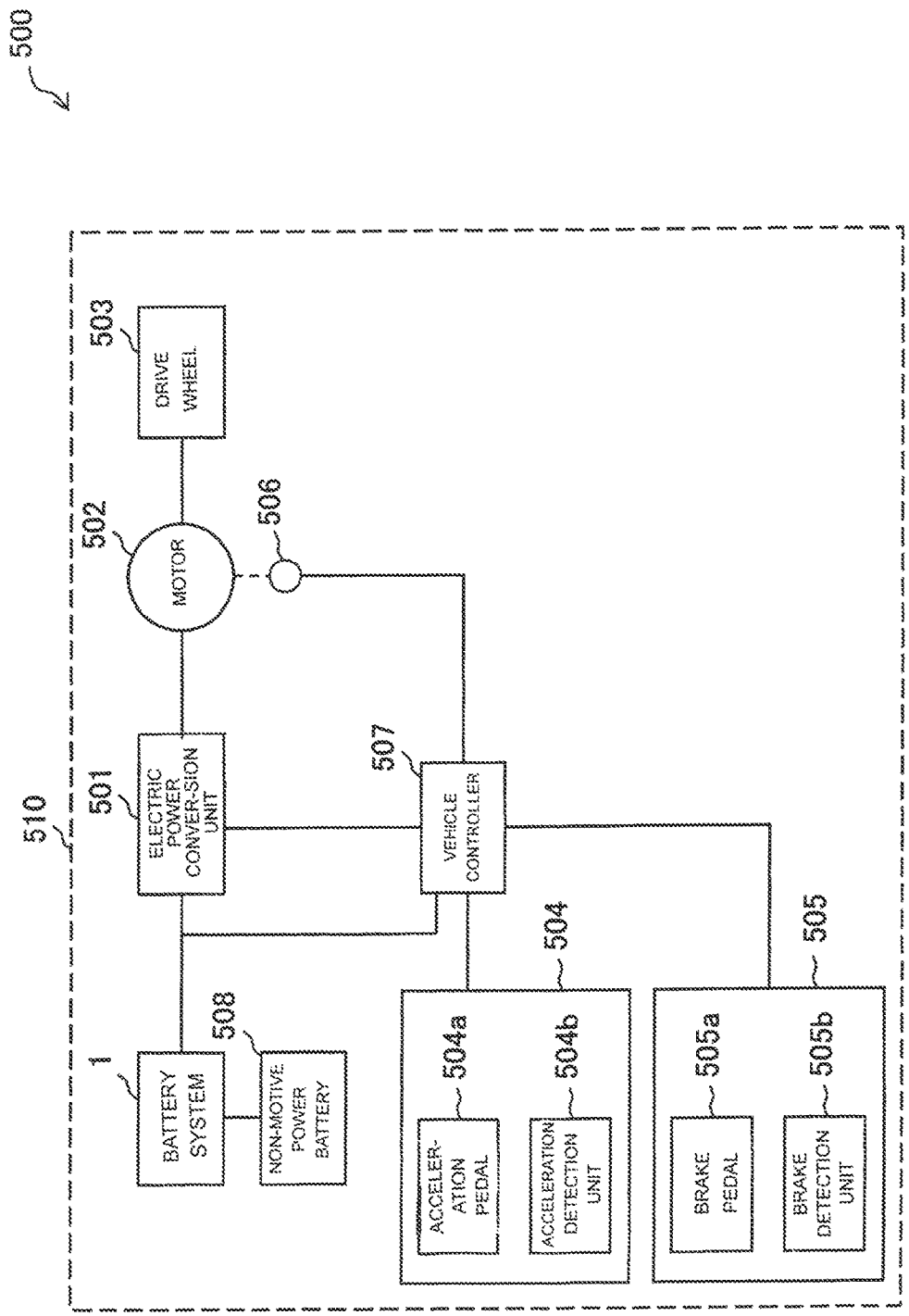
FIG. 23 is a block diagram showing a structure of an electric vehicle according to a tenth structure of the present invention.

A tenth structure will now be described. The battery system 1 can be equipped in various devices. For example, an electric vehicle 500 which travels using the output electric power of the battery module 11 as a drive source may be formed. FIG. 23 shows an example structure of the electric vehicle 500. The electric vehicle 500 of FIG. 23 comprises the battery system 1, a vehicle body 510, an electric power converter 501 which converts a DC electric power due to discharging of the battery module 11 in the battery system 1 into another electric power (such as AC electric power), a motor 502 which converts the other electric power into a motive power, a drive wheel 503 which is rotated by the motive power, an acceleration unit 504 having an acceleration pedal 504a and an acceleration detection unit 504b and which commands acceleration of the vehicle body 510, a brake unit 505 having a brake pedal 505a and a brake detection unit 505b and which commands deceleration of the vehicle body 510, a sensor 506 which detects a rotation number or a magnetic pole position of the motor 502, a vehicle controller 507 which comprehensively controls the operations of the components in the electric vehicle 500, and a non-motive power battery 508 which stores electric power for purposes other than the generation of the motive power. In the electric vehicle 500, the motor 502 may be considered as a load of the battery system 1.

The battery system 1 outputs a battery state signal such as a discharge permission signal and a discharge prohibition signal to the vehicle controller 507 while suitably referring to the cell voltage information, module voltage information, cell SOC information, module SOC information, etc. The vehicle controller 507 controls the electric power conversion operation by the electric power converter 501 based on the battery state signal, an acceleration command signal indicating a command state of acceleration supplied from the acceleration unit 504, a deceleration command signal indicating a command state of deceleration supplied from the brake unit 505, and a detection result of the sensor 506. The battery module 11 in the battery system 1 may be charged by regeneration. As described above, in the electric vehicle 500, the motor 502 receives the electric power from the battery module 11 in the battery system 1 and converts the electric power into the motive power, and the drive wheel 503 is rotated by the motive power so that the vehicle body 510 is moved. In the electric vehicle 500, it can be considered that the vehicle body 510 corresponds to a movable body unit, the motor 502 corresponds to a motive power source, and the drive wheel 503 corresponds to a drive unit.

The electric vehicle 500 is an example of a movable structure equipped with the battery system 1, and the battery system 1 may be equipped in other movable structures such as a ship, an airplane, an elevator, a walking robot, or the like.

A ship equipped with the battery system 1 comprises, for example, the motor 520, and also comprises a ship body, a screw, an acceleration input unit, and a deceleration input unit, in place of the vehicle body 510, drive wheel 503, acceleration unit 504, and brake unit 505 of the electric vehicle 500, respectively. A driver operates the acceleration input unit in place of the acceleration unit 504 when the ship body is to be accelerated, and operates the deceleration input unit in place of the brake unit 505 when the ship body is to be decelerated (similarly in the airplane or the like to be described later). Alternatively, a ship may be constructed in which the deceleration input unit is not provided. In such a ship, the motor 502 receives the electric power from the battery module 11 in the battery system 1 and converts the electric power into a motive power, and the screw is rotated by the motive power so that the ship body is moved. In the above-described ship, it can be considered that the ship body corresponds to the movable body unit, the motor 502 corresponds to the motive power source, and the screw corresponds to the drive unit.

An airplane equipped with the battery system 1 comprises, for example, the motor 502, and also comprises a plane body, a propeller, an acceleration input unit, and a deceleration input unit, in place of the vehicle body 510, drive wheel 503, acceleration unit 504, and brake unit 505 of the electric vehicle 500, respectively. Alternatively, an airplane may be constructed in which the deceleration input unit is not provided. In such an airplane, the motor 502 receives the electric power from the battery module 11 in the battery system 1 and converts the electric power into motive power, and the propeller is rotated by the motive power, so that the airplane body is moved. In the above-described airplane, it can be considered that the airplane body corresponds to the movable body unit, the motor 502 corresponds to the motive power source, and the propeller corresponds to the drive unit.

An elevator equipped with the battery system 1 comprises, for example, the motor 502, and also comprises a cage, an elevating/lowering rope attached to the cage, an acceleration input unit, and a deceleration input unit in place of the vehicle body 510, drive wheel 503, acceleration unit 504, and brake unit 505 of the electric vehicle 500, respectively. In such an elevator, the motor 502 receives the electric power from the battery module in the battery system 1, and converts the electric power into a motive power, and the elevating/lowering rope is wound by the motive power so that the cage is elevated or lowered. In the elevator, it can be considered that the cage corresponds to the movable body unit, the motor 502 corresponds to the motive power source, and the elevating/lowering rope corresponds to the drive unit.

A walking robot equipped with the battery system 1 comprises, for example, the motor 502, and also comprises a body, a leg, an acceleration input unit, and a deceleration input unit in place of the vehicle body 510, drive wheel 503, acceleration unit 504, and brake unit 505 of the electric vehicle 500, respectively. In such a walking robot, the motor 502 receives the electric power from the battery module 11 in the battery system 1, and converts the electric power into motive power, and the leg is driven by the motive power, so that the body is moved. In the walking robot, it can be considered that the body corresponds to the movable body unit, the motor 502 corresponds to the motive power source, and the leg corresponds to the drive unit.

As described, in a movable structure equipped with the battery system 1, the motive power source converts the electric power from the battery module 11 in the battery system 1 into motive power, and the motive power obtained by the motive power source is used by the drive unit to move the movable body unit. By applying the battery system 1 to the movable structure (including the electric vehicle 500), the operation and advantage of the battery system 1 can be achieved also in the movable structure.

<<Eleventh Structure>>

Figure 24:
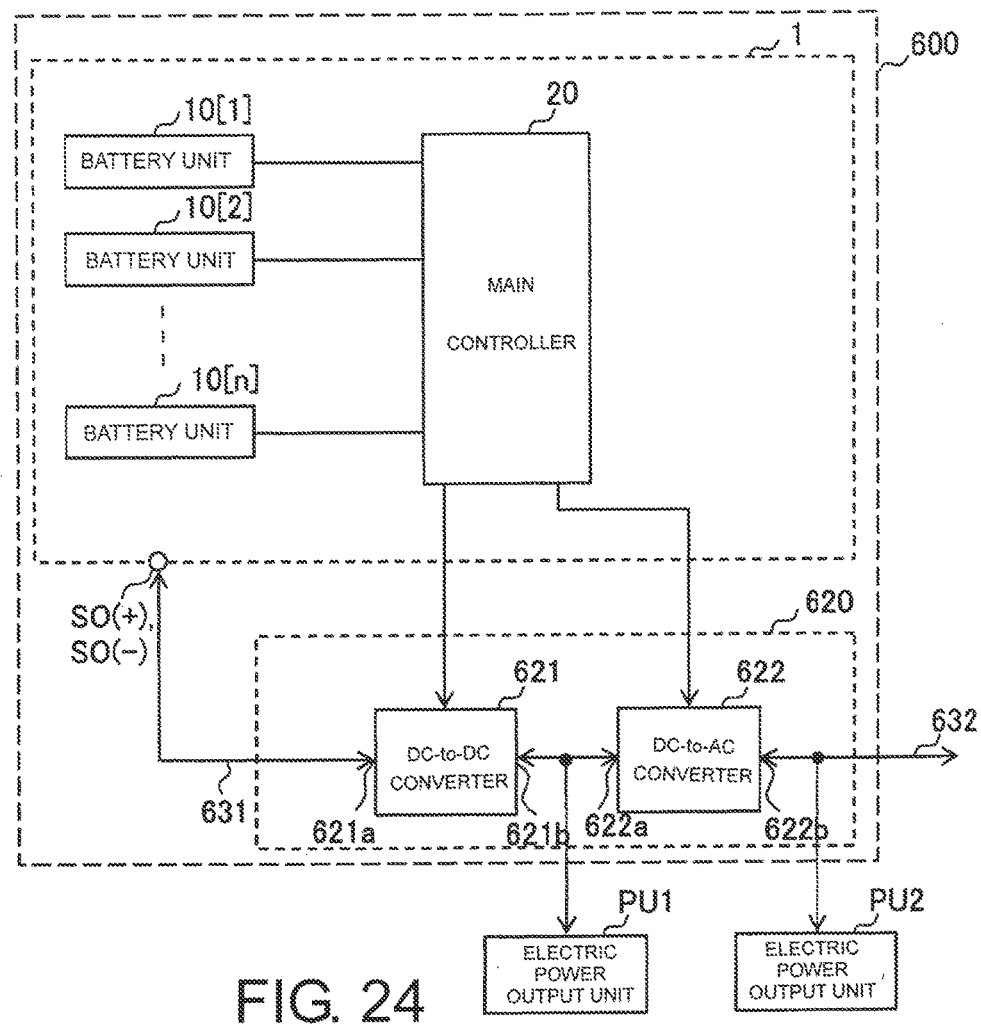
FIG. 24 is a block diagram showing a structure of a power supply device according to an eleventh structure of the present invention.

An eleventh structure will now be described. FIG. 24 is a block diagram showing a structure of a power supply device 600 according to the eleventh structure. The power supply device 600 comprises the battery system 1 which can also be called an electric power storage device, and an electric power conversion device (electric power converter) 620.

A pair of system output terminals including terminals SO(+) and SO(−) are connected to the electric power conversion device 620 via an electric power line 631. The electric power conversion device 620 comprises a DC-to-DC converter 621 and a DC-to-AC converter 622. The DC-to-DC converter 621 has input/output terminals 621a and 621b, and the DC-to-AC converter 622 has input/output terminals 622a and 622b. The input/output terminal 621a of the DC-to-DC converter 621 is connected to the system output terminals (SO(+) and SO(−)) through the electric power line 631. The input/output terminals 621b and 622a are connected to each other, and also to an electric power output unit PU1. The input/output terminal 622b is connected to an electric power output unit PU2, and may be connected to an electric power system 632 which is an electric power system separate from the power supply device 600. The connection of the electric power conversion device 620 and the electric power output units PU1 and PU2 is not a requirement.

The electric power output units PU1 and PU2 serving as examples of an external device include a plug. To the electric power output units PU1 and PU2, for example, various loads are connected. Each of the electric power output units PU1 and Pu2 may be considered as a load. The electric power system 632 includes a commercial power supply or a solar battery. A solar battery may be connected to the input/output terminal 621b. In this case, a DC voltage based on the power generation of the solar battery can be supplied to the input/output terminal 621b. When a solar battery system including the solar battery and a power conditioner is used as the electric power system 632, an AC output unit of the power conditioner can be connected to the input/output terminal 622b.

The main controller 20 controls the converters 621 and 622 while referring to the cell voltage information, module voltage information, cell SOC information, module SOC information, or the like of each battery unit 10, to control charging and discharging of each battery module 11 in the battery units 10[1]~10[n]. Under the control of the main controller 20, the electric power conversion device 620 uses the converters 621 and 622, to convert the electric power between the battery modules 11 in the battery units 10[1]~10[n] and the electric power output units PU1 and PU2 or the electric power system 632.

For example, under the control of the main controller 20, the DC-to-DC converter 621 converts the output DC electric power from the system output terminals (SO(+) and SO(−)) based on the output electric power of each battery module 11 into another DC electric power and outputs the other DC electric power from the input/output terminal 621b, and the DC-to-AC converter 622 converts the DC electric power from the input/output terminal 621b into AC electric power and outputs the AC electric power from the input/output terminal 622b. Alternatively, for example, under the control of the main controller 20, the DC-to-AC converter 622 converts the AC electric power from the electric power system 632 into DC electric power and outputs the DC electric power from the input/output terminal 622a, and the DC-to-DC converter 621 converts the DC electric power from the input/output terminal 622a into another DC electric power and outputs the other DC electric power from the input/output terminal 621a. In this manner, each battery module 11 can be charged with the DC electric power from the input/output terminal 621a.

<<Alternative Structures>>

The preferred embodiments of the present invention can be modified in various ways within the scope of the technical idea described in the claims. The above-described configurations are merely example of the preferred embodiments of the present invention, and the meanings of the terms in the constituent elements and in the present invention are not limited to those used in the embodiments described above. The specific numerical values shown in the description above are merely exemplary, and may be changed to various other values. As notes that can be applied to the above-described preferred embodiments of the present invention, the following notes 1-3 are described. The contents in the notes can be arbitrarily combined so long as there is no contradiction.

[Note 1]

In the above-described example configuration, information of the cell voltage, cell SOC, module voltage, and module SOC detected at each battery unit 10 are input from each battery unit to the main controller 20. Alternatively, the function of the unit controller 12 may be assigned to the main controller 20, and the main controller 20 itself may detect the cell voltage, cell SOC, module voltage, and module SOC.

[Note 2]

The external unit 50 may also be called an adjustment unit. The adjustment unit serving as the external unit 50 may be considered to be included in the constituent elements of the battery system 1.

[Note 3]

Figure 25:
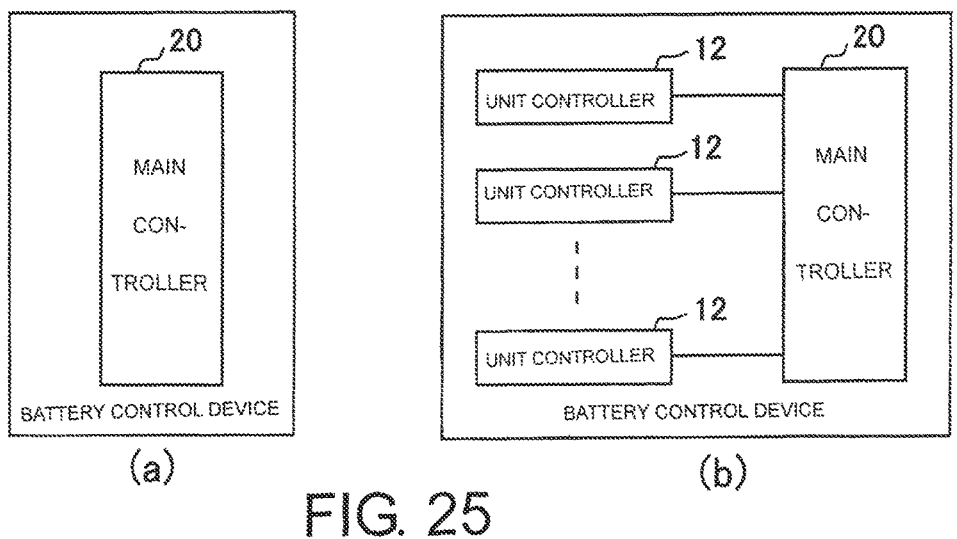
FIGS. 25(a) and 25(b) are diagrams showing a structure of a battery control device provided in the battery system.

A part remaining after removing the battery units 10[1]~10[n] from the battery system 1 or a part remaining after removing the battery modules 11 of the battery units 10[1]~10[n] may be called a battery control device. The battery control device includes at least the main controller 20 as a constituent element, and may further include the unit controller 12 as a constituent element (refer to FIGS. 25(a) and 25(b)).

What is claimed is:

1. A battery system comprising:
   a plurality of battery units each having a battery module consisting of a plurality of battery cells and a connector that is connected to the battery module and that can be connected to an external unit having a function to execute a voltage adjustment; and
   a voltage adjustment necessity determination unit that determines, for each battery unit, whether or not the voltage adjustment for inhibiting a voltage variation among the battery modules or the battery cells is necessary, wherein
   based on a result of determination of the voltage adjustment necessity determination unit, connection of the external unit to a battery unit for which the voltage adjustment is necessary is permitted or the external unit is connected to the battery unit for which the voltage adjustment is necessary, and
   in each battery unit, the voltage adjustment is enabled when the external unit is connected to the connector.

2. The battery system according to claim 1, further comprising:
   a drive mechanism that moves an entirety or a part of the external unit so that a connector of a battery unit is connected to the external unit; and
   a drive mechanism controller that controls the drive mechanism.

3. The battery system according to claim 2, wherein
   the drive mechanism controller executes a round connection process in which the drive mechanism is controlled so that the connectors of the plurality of battery units are sequentially connected to the external unit, and, in the execution of the round connection process, the external unit is connected to a battery unit for which the voltage adjustment is necessary.

4. The battery system according to claim 1, wherein
   the voltage adjustment necessity determination unit determines whether or not the voltage adjustment is necessary for each battery unit based on at least one of voltage information of each battery module, voltage information of each battery cell in each battery module, remaining capacity information corresponding to a remaining capacity of each battery module, and remaining capacity information corresponding to a remaining capacity of each battery cell in each battery module.

5. The battery system according to claim 1, further comprising:
   a system output terminal that guides output electric power of each battery module to a side of a load;
   a switch unit interposed between each battery module and the system output terminal; and
   a switch controller that controls the switch unit, wherein
   when one of the plurality of battery modules or one of the plurality of battery units is to be replaced as a replacement target with a new battery module or a new battery unit, the switch controller controls the switch unit to disconnect the connection between the replacement target and the system output terminal, and, after the voltage adjustment is executed for the new battery module, controls the switch unit to connect the new battery module to the system output terminal.

6. The battery system according to claim 1, further comprising the external unit.

7. An electric vehicle comprising:
   the battery system according to claim 1;
   a motor driven by an electric power of each battery module in the battery system; and
   a drive wheel that is rotated by a motive power of the motor.

8. A movable structure comprising:
   the battery system according to claim 1;
   a movable body unit;
   a motive power source that converts electric power from each battery module in the battery system into motive power; and
   a drive unit that moves the movable body unit by the motive power from the motive power source.

9. A power supply device comprising:
   the battery system according to claim 1; and
   an electric power conversion device that executes electric power conversion between each battery module in the battery system and an external device or an electric power system, wherein
   the power supply device can be connected to the external device or the electric power system.

* * * * *